(12) United States Patent
Kim

(10) Patent No.: US 11,174,984 B2
(45) Date of Patent: Nov. 16, 2021

(54) DISPLAY APPARATUS

(71) Applicant: Samsung Electronics Co., Ltd., Suwon-si (KR)

(72) Inventor: Yong Ku Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/863,200

(22) Filed: Apr. 30, 2020

(65) Prior Publication Data

US 2020/0256508 A1 Aug. 13, 2020

Related U.S. Application Data

(63) Continuation of application No. 15/998,544, filed on Aug. 16, 2018, now Pat. No. 10,655,778.

(30) Foreign Application Priority Data

Aug. 16, 2017 (KR) .................. 10-2017-0103619
Aug. 10, 2018 (KR) .................. 10-2018-0093698

(51) Int. Cl.
*H04N 5/64* (2006.01)
*F16M 11/42* (2006.01)
(Continued)

(52) U.S. Cl.
CPC ......... *F16M 11/425* (2013.01); *F16M 11/043* (2013.01); *F16M 11/045* (2013.01);
(Continued)

(58) Field of Classification Search
CPC .... F16M 11/24; F16M 11/043; F16M 11/105; F16M 11/2085; F16M 11/18;
(Continued)

(56) References Cited

U.S. PATENT DOCUMENTS 7,304,838 B2 12/2007 Kumano et al.
9,625,793 B1 4/2017 Lai et al.
(Continued)

FOREIGN PATENT DOCUMENTS

KR 10-2015-0109291 10/2015
KR 10-1722480 4/2017

OTHER PUBLICATIONS

International Search Report and Written Opinion of the International Searching Authority dated Dec. 3, 2018 in International Patent Application No. PCT/KR2018/009416.
(Continued)

*Primary Examiner* — Robert Chevalier
(74) *Attorney, Agent, or Firm* — Staas & Halsey, LLP

(57) ABSTRACT

A display apparatus includes a display assembly, and a mounting device on which the display assembly is supported. The mounting device may include a stand having a supporting boss, a rail disposed on a rear surface of the display assembly, and configured to move the display assembly in a straight line direction with respect to the supporting boss, and a rotation guide disposed at an end of the rail such that the display assembly rotates with respect to the supporting boss, wherein the display assembly is rotatable when the supporting boss is positioned on the rotation guide.

20 Claims, 44 Drawing Sheets

(51) Int. Cl.
  *F16M 11/10*   (2006.01)
  *F16M 11/04*   (2006.01)
  *F16M 11/18*   (2006.01)
  *F16M 11/20*   (2006.01)
  *F16M 11/24*   (2006.01)
  *G06F 1/16*    (2006.01)

(52) U.S. Cl.
  CPC ......... *F16M 11/046* (2013.01); *F16M 11/105* (2013.01); *F16M 11/18* (2013.01); *F16M 11/2028* (2013.01); *F16M 11/2085* (2013.01); *F16M 11/24* (2013.01); *F16M 11/42* (2013.01); *G06F 1/1601* (2013.01)

(58) Field of Classification Search
  CPC .... F16M 11/42; F16M 11/425; F16M 11/045; F16M 11/046; F16M 11/2028; G06F 1/1601
  USPC .................. 348/843, 836, 739, 729, 571, 36
  See application file for complete search history.

(56) References Cited

U.S. PATENT DOCUMENTS

| | | |
|---|---|---|
| 2003/0075649 A1 | 4/2003 | Jeong et al. |
| 2005/0205731 A1 | 9/2005 | Shimizu et al. |
| 2007/0205340 A1 | 9/2007 | Jung |
| 2009/0090825 A1 | 4/2009 | Jung et al. |
| 2009/0242722 A1 | 10/2009 | Lee et al. |
| 2011/0174938 A1* | 7/2011 | Calderon ............. F16M 11/105 248/125.7 |
| 2017/0311737 A1* | 11/2017 | Law ..................... F16M 11/041 |

OTHER PUBLICATIONS

U.S. Office Action dated Sep. 11, 2019 in U.S. Appl. No. 15/998,544.
U.S. Notice of Allowance dated Jan. 14, 2020 in U.S. Appl. No. 15/998,544.
U.S. Appl. No. 15/998,544, filed Aug. 16, 2018, Yong Ku Kim, Samsung Electronics Co., Ltd.
Supplementary European Search Report for European Application No. 18 84 6392 dated Jun. 30, 2021.

* cited by examiner

DISPLAY APPARATUS

CROSS-REFERENCE TO RELATED APPLICATIONS

This application is a continuation application of U.S. patent application Ser. No. 15/998,544, filed on Aug. 16, 2018, which claims the priority benefit of Korean Patent Application No. 10-2017-0103619, filed on Aug. 16, 2017 in the Korean Intellectual Property Office, and Korean Patent Application No. 10-2018-0093698, filed on Aug. 10, 2018 in the Korean Intellectual Property Office, the disclosures of which are incorporated herein by reference in their entirety.

BACKGROUND

1. Field

Embodiments of the disclosure relate to a display apparatus, and more particularly, to a display apparatus having an improved mounting structure.

2. Description of the Related Art

In general, a display apparatus displays a screen, and examples of the display apparatus include a monitor and a television. The display apparatus uses a self-emitting display panel such as an Organic Light-Emitting Diode (OLED) or a light-receiving display panel such as a Liquid Crystal Display (LCD) panel.

The display apparatus includes a display assembly for displaying images and a stand for supporting the display assembly. The display assembly is formed in the shape of a plate, and accordingly, a structure such as a stand for standing or supporting the display assembly is required.

There are cases in which users of different heights use the display apparatus or in which users use the display apparatus in different usage environments or with different usage purposes. For these cases, a structure for supporting a display assembly at different positions is required.

SUMMARY

Therefore, it is an aspect of the present disclosure to provide a display apparatus capable of improving a mounting structure of a display assembly.

It is another aspect of the present disclosure to provide a display apparatus having a structure capable of stably supporting a display assembly.

It is still another aspect of the present disclosure to provide a display apparatus capable of changing a display mode of a display assembly.

In accordance with one aspect of the disclosure, a display apparatus includes a display assembly and a mounting device on which the display assembly is supported. The mounting device includes a stand having a supporting boss, a rail disposed on a rear surface of the display assembly, and configured to move the display assembly in a straight line direction with respect to the supporting boss and a rotation guide disposed at an end of the rail, and configured to rotate the display assembly with respect to the supporting boss, wherein the display assembly is rotatable when the supporting boss is positioned on the rotation guide.

The mounting device is configured to vary a distance between a mounting surface on which the stand is supported and the display assembly, according to an angle of rotation of the display assembly.

A linear movement of the display assembly is allowed when the supporting boss is positioned on the rail, and a rotation of the display assembly is allowed when the supporting boss is positioned on the rotation guide.

The rotation guide forms a center of rotation of the display assembly, and is spaced an eccentric distance from the center of the display assembly.

The center of the display assembly is a center in horizontal and vertical direction of the display assembly, or the center of gravity of the display assembly.

The rail extends from a center of the display assembly.

The display assembly is configured to operate in a landscape mode or a portrait mode by a rotation by the rotation guide, and when the display assembly rotates from one mode of the landscape mode and the portrait mode to the other mode of the landscape mode and the portrait mode, a distance between a mounting surface on which the stand is supported and the display assembly varies according to a rotation angle.

The rotation guide includes a boss holder configured to form a boss insertion portion into which the supporting boss is inserted and a rotation holder rotatably disposed with respect to the boss holder, and fixed on a rear surface of the display assembly.

When the supporting boss is inserted into the boss holder, the boss holder is prevented from rotating, and the rail and the rotation holder are rotatable together with the display assembly.

The rotation holder includes a holder body disposed along a circumference of the boss holder and a path forming portion forming a boss path connecting the rail to the boss insertion portion.

The rotation holder selectively disconnects the rail from the boss insertion portion through the holder body by a rotation of the display assembly.

The rotation guide includes a first rotation guide disposed eccentrically at a first distance in one direction from a center of the display assembly and a second rotation guide disposed eccentrically at a second distance in the other direction from the center of the display assembly.

The linear movement comprises a horizontal movement. The rail is configured to limit a movement of the display assembly to the horizontal movement.

The rail comprises a pair of guide rails extending in the horizontal direction and restricting upper and lower portions of the supporting boss.

In accordance with one aspect of the disclosure, a display apparatus includes a display assembly positioned in one mode of a landscape mode and a portrait mode; and, a mounting device on which the display assembly is mounted. The mounting device includes a stand having a supporting boss, and supported on a mounting surface and a guide apparatus on which the supporting boss is mounted and which is disposed on a rear surface of the display assembly such that the display assembly moves or rotates with respect to the supporting boss. The guide apparatus includes a rotation guide to which the supporting boss is inserted to perform a rotation operation of the display assembly, the rotation guide configured to change a height of the display assembly from the mounting surface according to a rotation angle when the display assembly rotates from one mode of the landscape mode and the portrait mode to the other mode of the landscape mode and the portrait mode.

The rotation guide is eccentrically spaced from the center of the display assembly. The guide apparatus further comprises a rail which extends from the center of the display assembly to the rotation guide and on which the supporting boss is located.

The rotation guide includes a boss holder into which the supporting boss is inserted and a rotation holder rotatably mounted on the boss holder, and fixed on a rear surface of the display assembly.

When the supporting boss is inserted into the boss holder, the boss holder is prevented from rotating, and the rail and the rotation holder are rotatable together with the display assembly.

When the supporting boss is positioned on the rail, the display assembly is linearly movable. When the supporting boss is positioned in the rotation guide, the display assembly is rotatable.

In accordance with one aspect of the disclosure, a display apparatus includes display assembly and a rotation guide rotatably supporting the display assembly, the display assembly having a rotation center deviated from its center. The rotation guide is configured to move the center of the display assembly in at least one of a horizontal direction and a vertical direction by rotation of the display assembly.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
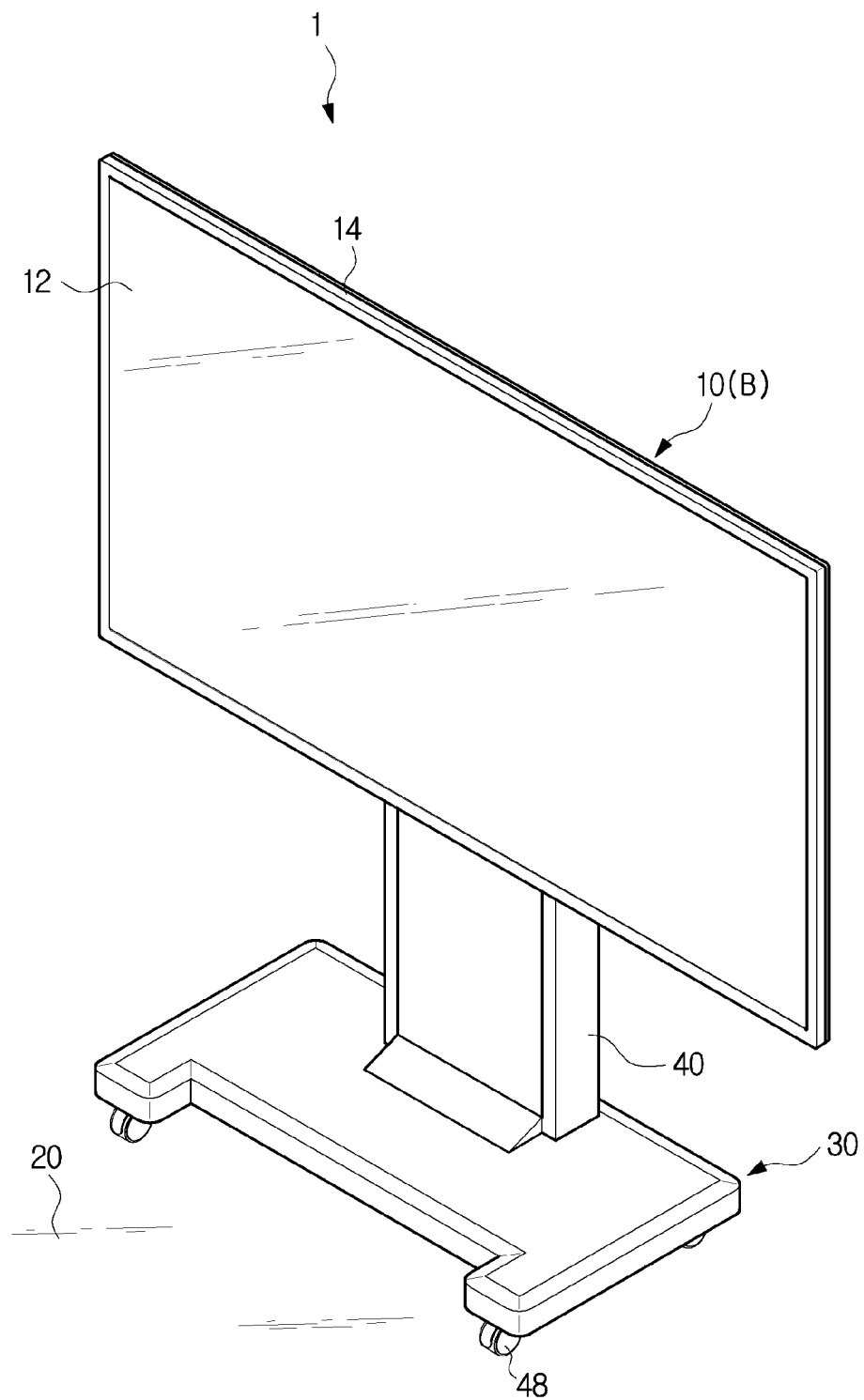
FIG. 1 is a perspective view of a display apparatus according to an embodiment of the present disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are used to describe the embodiments of the present disclosure. Accordingly, it should be apparent to those skilled in the art that the following description of exemplary embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments of the present disclosure will be described in detail with reference to the accompanying drawings.

Figure 2:
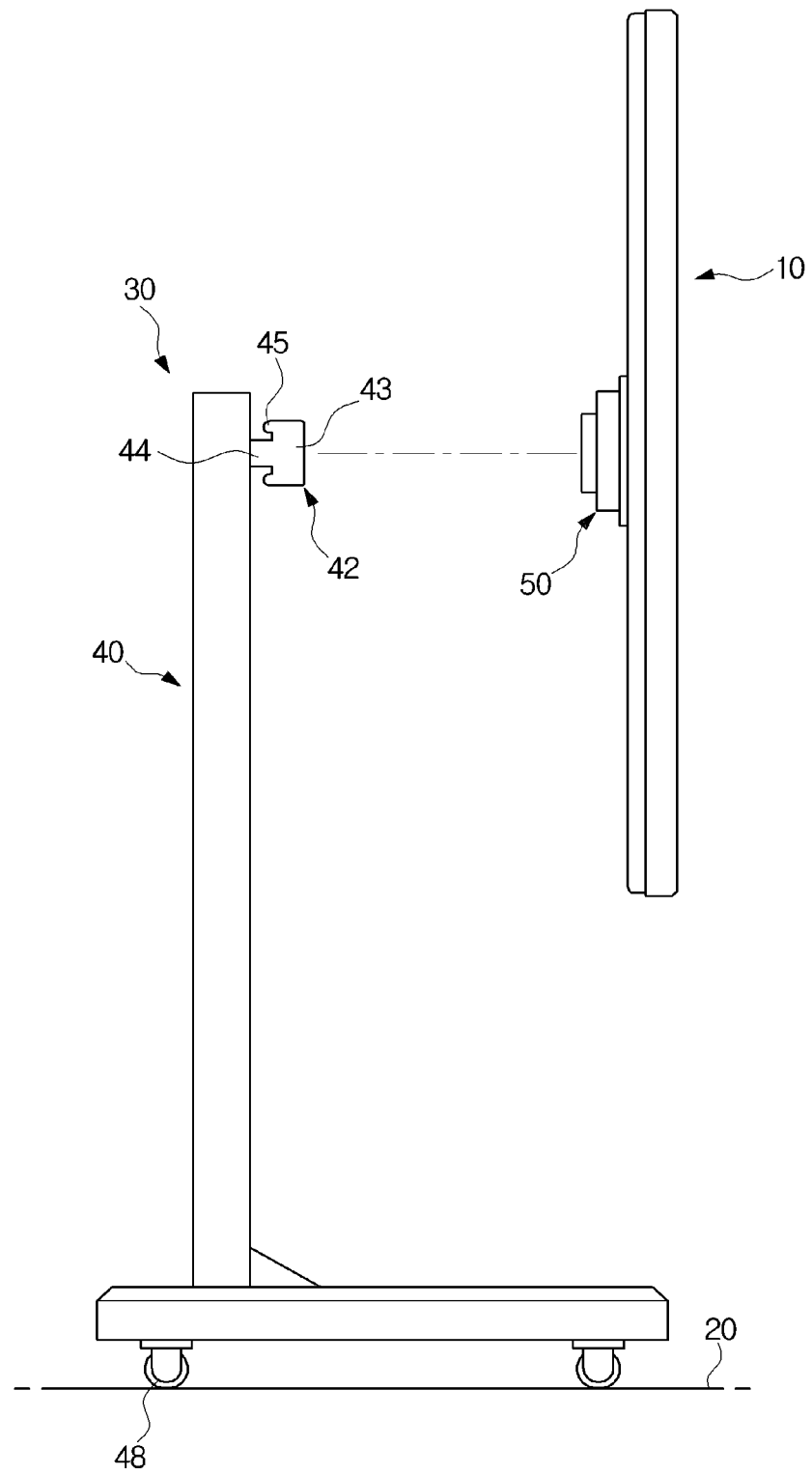
FIG. 2 is an exploded view of a display apparatus according to an embodiment of the present disclosure.
Figure 3:
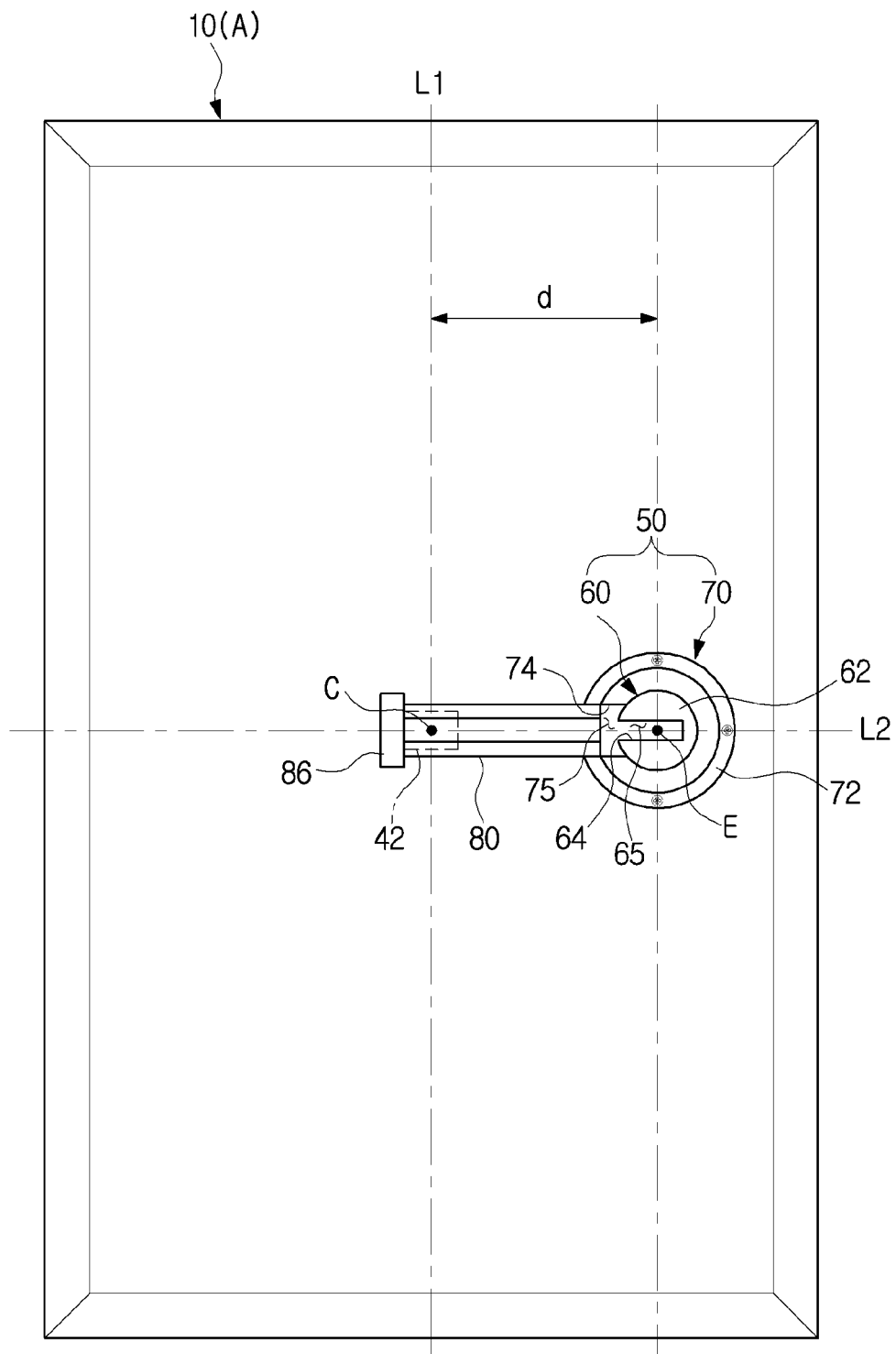
FIG. 3 is a rear view of a display assembly of a display apparatus according to an embodiment of the present disclosure.
Figure 4:
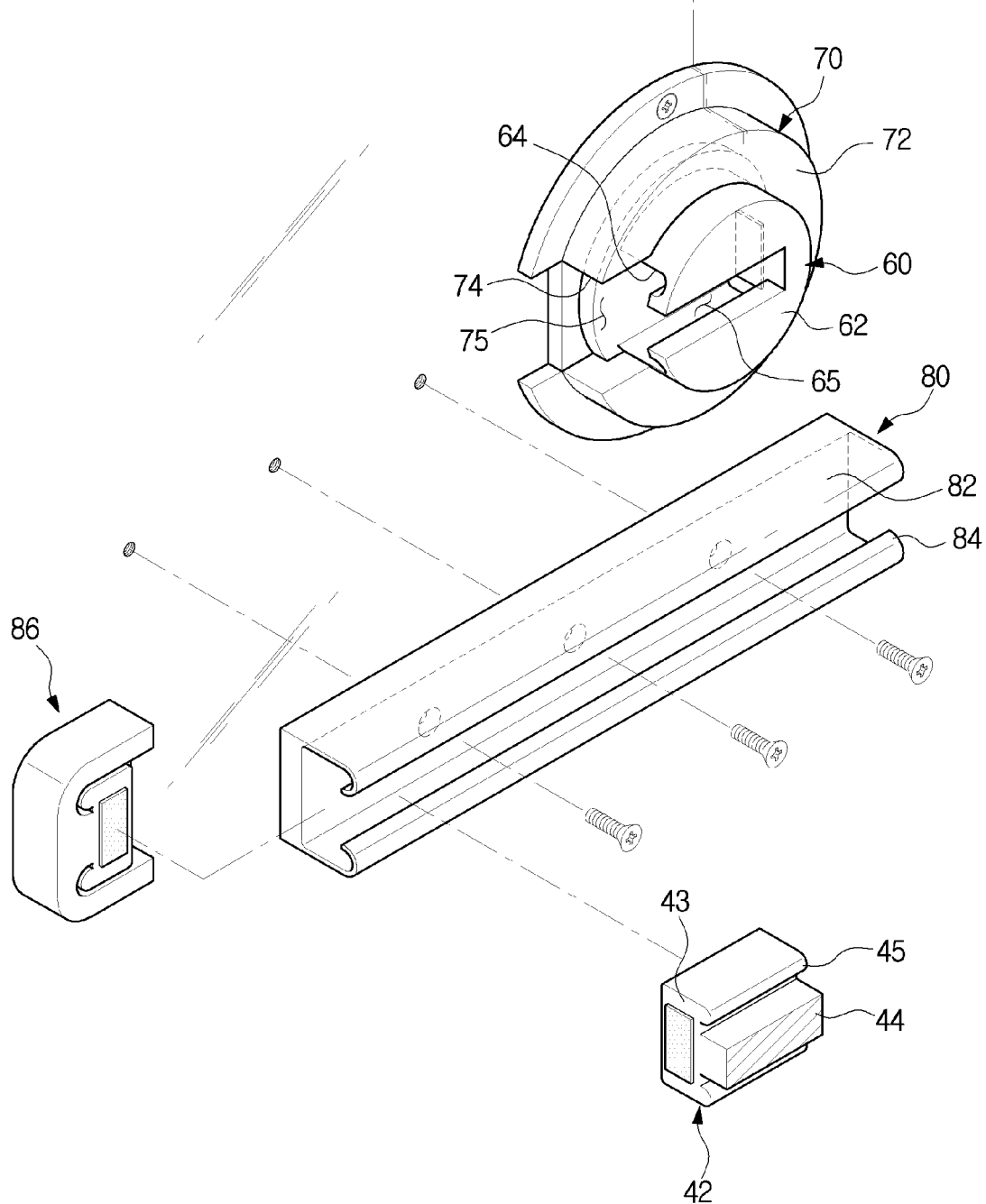
FIG. 4 is an exploded perspective view of a guide apparatus of a display apparatus according to an embodiment of the present disclosure.

FIG. 1 is a perspective view of a display apparatus according to an embodiment of the present disclosure. FIG. 2 is an exploded view of a display apparatus according to an embodiment of the present disclosure. FIG. 3 is a rear view of a display assembly of a display apparatus according to an embodiment of the present disclosure, and FIG. 4 is an exploded perspective view of a guide apparatus of a display apparatus according to an embodiment of the present disclosure.

The following description will be given under an assumption that the display apparatus is a flat panel display apparatus, however, the display apparatus may be a curved display apparatus having a screen of a fixed curvature, or a bendable or flexible display apparatus capable of changing the curvature of the screen, although not limited thereto.

A display apparatus 1 may include a display assembly 10 for displaying images and a mounting device 30 for supporting the display assembly 10.

The display assembly 10 may include a display panel 12, a backlight unit (not shown) for supplying light to the display panel 12, and a display chassis 14 forming an outer appearance of the display assembly 10.

The display assembly 10 may be positioned in a landscape mode B in which the horizontal length is longer than the vertical length, and in a portrait mode A in which the vertical length is longer than the horizontal length. A user may change the landscape mode B to the portrait mode A or the portrait mode A to the landscape mode B according to a usage pattern.

The mounting device 30 may support the display assembly 10. The display assembly 10 may be mounted on the mounting device 30.

The mounting device 30 may include a stand 40 and a rotation guide 50 disposed on a rear surface of the display assembly 10.

The stand 40 may be supported by a mounting surface 20 on which the display apparatus 1 is mounted. The stand 40 may be a stand type that is rested on a floor or a table, or a ceiling type fixed on a ceiling. Also, the stand 40 may be a wall-mounted type for mounting the display assembly 10 on a wall. In the current embodiment, it is assumed that the stand 40 is a stand type that is rested on a floor. However, the stand 40 may be one of the above-mentioned types, and may be any kind of a stand as long as it can support the display assembly 10.

The stand 40 may include a supporting boss 42. The supporting boss 42 may be mounted on the display assembly 10, and then rested on the rotation guide 50 or the rail 80, which will be described later. The supporting boss 42 may be fixed at the stand 40.

The supporting boss 42 may include a boss body 43 positioned between a pair of guide rails 82 of the rail 80 which will be described later, and a connecting boss 44 connecting the boss body 43 to the stand 40.

The mounting device 30 may include a moving roller 48. A moving roller 48 may move the stand 40. A user may easily move the mounting device 30 on which the display assembly 10 is mounted through the moving roller 48.

The rotation guide 50 may rotate the display assembly 10. The rotation guide 50 may be disposed on the rear surface of the display assembly 10. The rotation guide 50 may rotate the display assembly 10 to convert between the landscape mode B and the portrait mode A.

The rotation guide 50 may be spaced apart from a center of the display assembly 10. The center of the display assembly 10 is referred to as an assembly center (C, see FIG. 3). When the display assembly 10 is in the landscape mode B, a horizontal direction center line passing the assembly center C is referred to as a first center line L1, and a vertical direction center line passing the assembly center C is referred to as a second center line L2. The assembly center C may be a center in horizontal and vertical direction of the display assembly 10, or the center of gravity of the display assembly 10.

The rotation guide 50 may be spaced an eccentric distance d apart from the assembly center C. With the configuration, the display assembly 10 may be rotatable with respect to a position deviated from the assembly center C.

Figure 5:
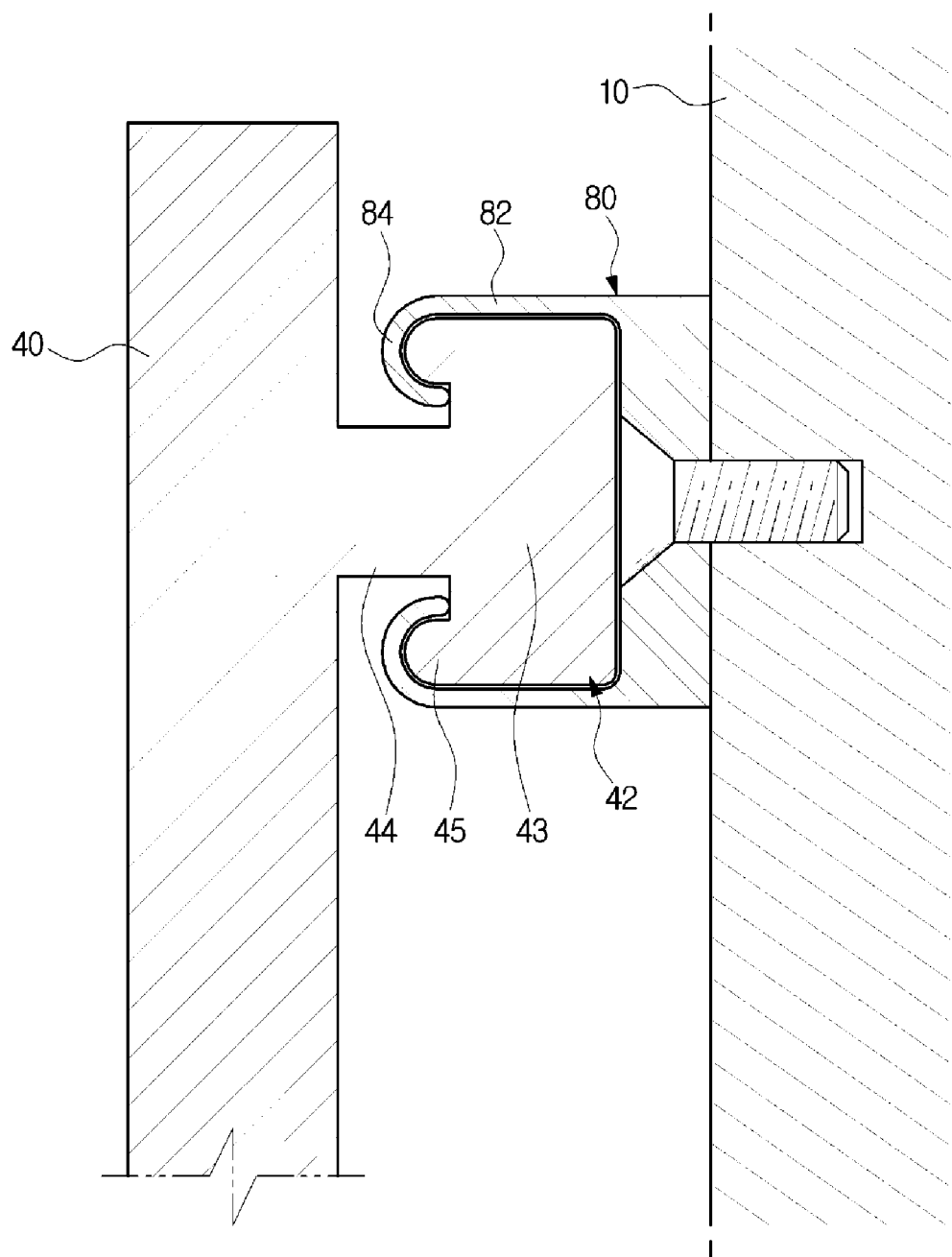
FIG. 5 is a cross-sectional view showing a part of a configuration of a display apparatus according to an embodiment of the present disclosure.

FIG. 5 is a cross-sectional view showing a part of a configuration of a display apparatus according to an embodiment of the present disclosure. Hereinafter, the display apparatus 1 will be described with reference to FIGS. 1 to 5.

The mounting device 30 may include a rail 80. The rotation guide 50 and the rail 80 are collectively referred to as a guide apparatus.

The rail 80 may cause the display assembly 10 to move in a straight line direction. The rail 80 may be disposed on the rear surface of the display assembly 10. The straight line direction may include a horizontal direction and a vertical direction with respect to the display assembly 10. In the current embodiment, a configuration in which the display assembly 10 is located in the portrait mode A and moves in a vertical direction or along a second center line L2 through the rail 80 will be described. However, the display assembly 10 may be positioned in the landscape mode B, and move in a horizontal direction or along the first center line L1 through the rail 80.

The rail 80 may pass the assembly center C. That is, the rail 80 may pass the assembly center C, and be disposed along the second center line L2. In the current embodiment, the rotation guide 50 spaced from the assembly center C may be disposed at one end of the rail 80, and the other end of the rail 80 may be located at the assembly center C. With this configuration, when the display assembly 10 is in the landscape mode B or in the portrait mode A, the assembly center C and the supporting boss 42 may be placed on the same center line to stably support the display assembly 10. A boss stopper 86 may be disposed at the other end of the rail 80 so that the supporting boss 42 is not separated from the rail 80.

The rail 80 may limit a linear movement of the display assembly 10 when the supporting boss 42 is located on the rail 80. That is, the rail 80 may include a pair of guide rails 82 to limit a horizontal movement of the display assembly 10.

The pair of guide rails 82 may restrict both sides of the supporting boss 42 to cause the display assembly 10 to move linearly. In the current embodiment, the pair of guide rails 82 may restrict the upper and lower portions of the supporting boss 42, and extend in a horizontal movement direction. That is, the pair of guide rails 82 may restrict the upper and lower portions of the supporting boss 42, and extend along the second center line L2. Since the rail 80 is movable in the horizontal direction with respect to the supporting boss 42, the display assembly 10 fixed to the rail 80 may also be movable in the horizontal direction. That is, the rail 90 may prevent the display assembly 10 from rotating.

The rail 80 may include a separation-preventing hook 84. The separation-preventing hook 84 may prevent the supporting boss 42 from being separated from the pair of guide rails 82. A pair of separation-preventing hooks 84 may be provided. An interval between the pair of separation-preventing hooks 84 may be smaller than that between the pair of guide rails 82. Accordingly, the separation-preventing hooks 84 may prevent the supporting boss 42 located between the pair of guide rails 82 from being separated from the rail 80.

The separation-preventing hook 84 may be formed convexly from the supporting boss 42 located on the rail 80. The supporting boss 42 may also include a convex projection 45 convexly formed from the boss body 43 to correspond to the separation-preventing hook 84.

The display assembly 10 may move linearly when the supporting boss 42 is positioned on the rail 80, and may rotate when the supporting boss 42 is positioned on the rotation guide 50. In other words, by separating a configuration for linearly moving the display assembly 10 from a configuration for rotating the display assembly 10, a configuration of the mounting device 30 for supporting the display assembly 10 may be miniaturized. In addition, even when a display mode (the landscape mode B and the portrait mode A) changes, the mounting device 30 may stably support the display assembly 10.

The rotation guide 50 may be disposed at one end of the rail 80.

The rotation guide 50 may include a boss holder 60 and a rotation holder 70.

The supporting boss 42 may be inserted into the boss holder 60. The boss holder 60 may include a boss inserting portion 64 forming an insertion space 65 into which the supporting boss 42 is inserted. The supporting boss 42 may be inserted into the boss insertion portion 64 through a horizontal movement of the display assembly 10.

The supporting boss 42 inserted into the boss insertion portion 64 may escape from the rail 80 to thereby be released from the rail 80. As a result, the display assembly 10 may become rotatable.

The rotation holder 70 may be rotatable with respect to the boss holder 60, and may be fixed on the rear surface of the display assembly 10. That is, the rotation holder 70 may be fixed on the rear surface of the display assembly 10, and move and rotate together with the display assembly 10. The boss holder 60 may be positioned within the rotation holder 70, and prevent the boss holder 60 from escaping from the rotation holder 70. That is, the rotation holder 70 may be rotatable with respect to the boss holder 60, while being not separated from the boss holder 60.

The boss holder 60 may include a boss holder body 62 formed in a circular shape so that the rotation holder 70 may rotate outside the boss holder 60. On the boss holder body 62, the boss insertion portion 64 described above may be formed.

The rotation holder 70 may include a holder body 72 disposed along the circumference of the boss holder 60, and a path forming portion 72 forming a boss path 75 connecting the rail 80 to the boss insertion portion 64. The path forming portion 72 may form the boss path 75 through which the supporting boss 42 passes when the supporting boss 42 moves from the rail 80 to the boss insertion portion 64 due to a movement of the display assembly 10.

The rotation holder 70 may selectively disconnect the boss insertion portion 64 from the rail 80 when the display assembly 10 rotates. When the supporting boss 42 is located on the rail 80, the boss path 75 may be located between the boss insertion portion 64 and the rail 80. However, when the supporting boss 42 is inserted into the boss insertion portion 64, the display assembly 10 may become rotatable. The rotation holder 70 rotating together with the display assembly 10 may disconnect the rail 80 from the boss insertion portion 64 through the holder body 72.

With the configuration, the supporting boss 42 may be restricted by the boss insertion portion 64, thereby limiting a linear movement of the display assembly 10.

The rotation guide 50 and the rail 80 may be fixed on the rear surface of the display assembly 10, although not limited thereto. For example, the display assembly 10 may be detachably mounted on the rear surface of the display assembly 10, and may be mounted at various positions on the rear surface of the display assembly 10 according to the user's convenience.

Hereinafter, operations of a display apparatus according to the present disclosure will be described.

Figure 6:
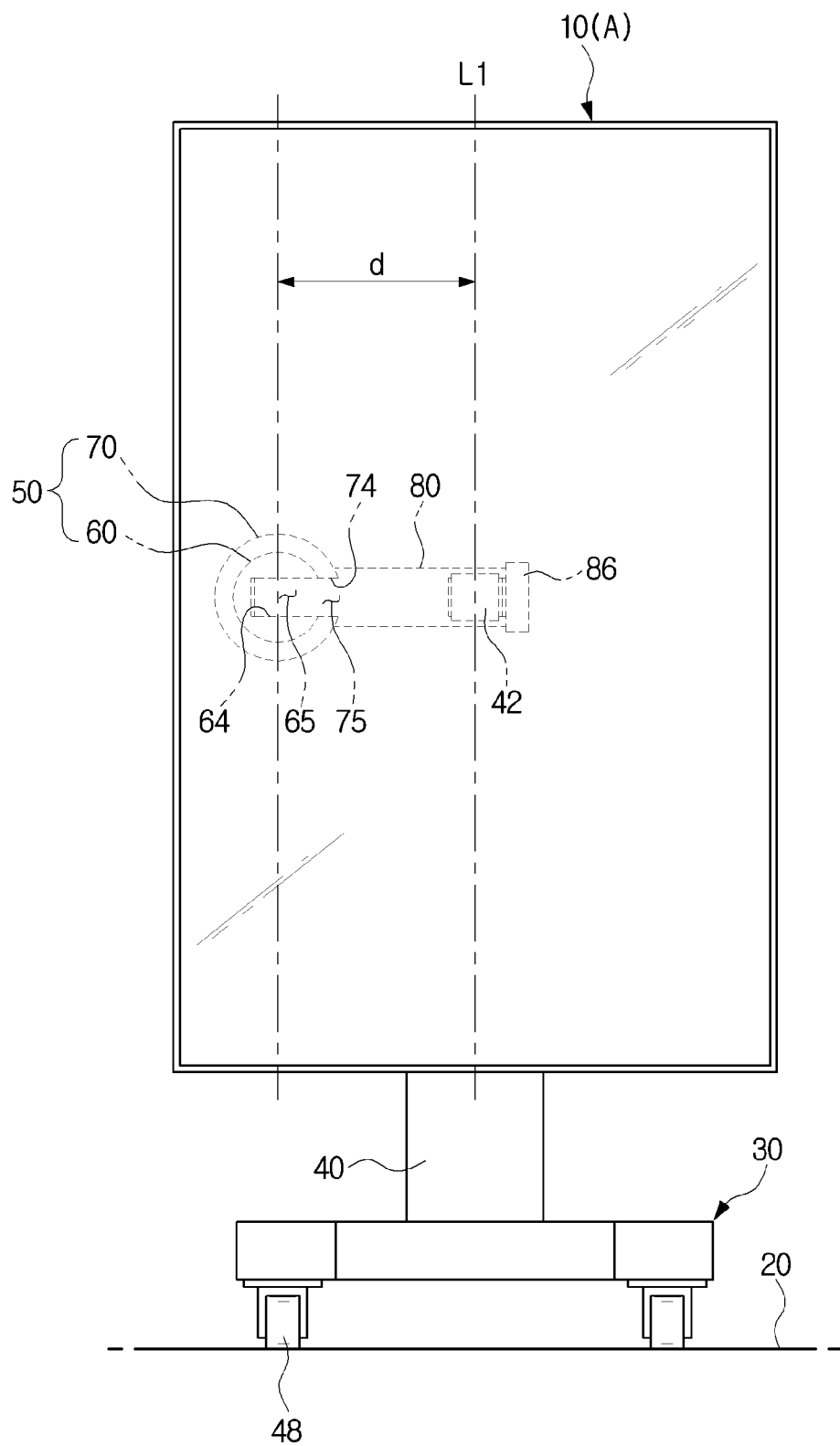
FIG. 6 is a front view of a display apparatus according to an embodiment of the present disclosure.
Figure 7:
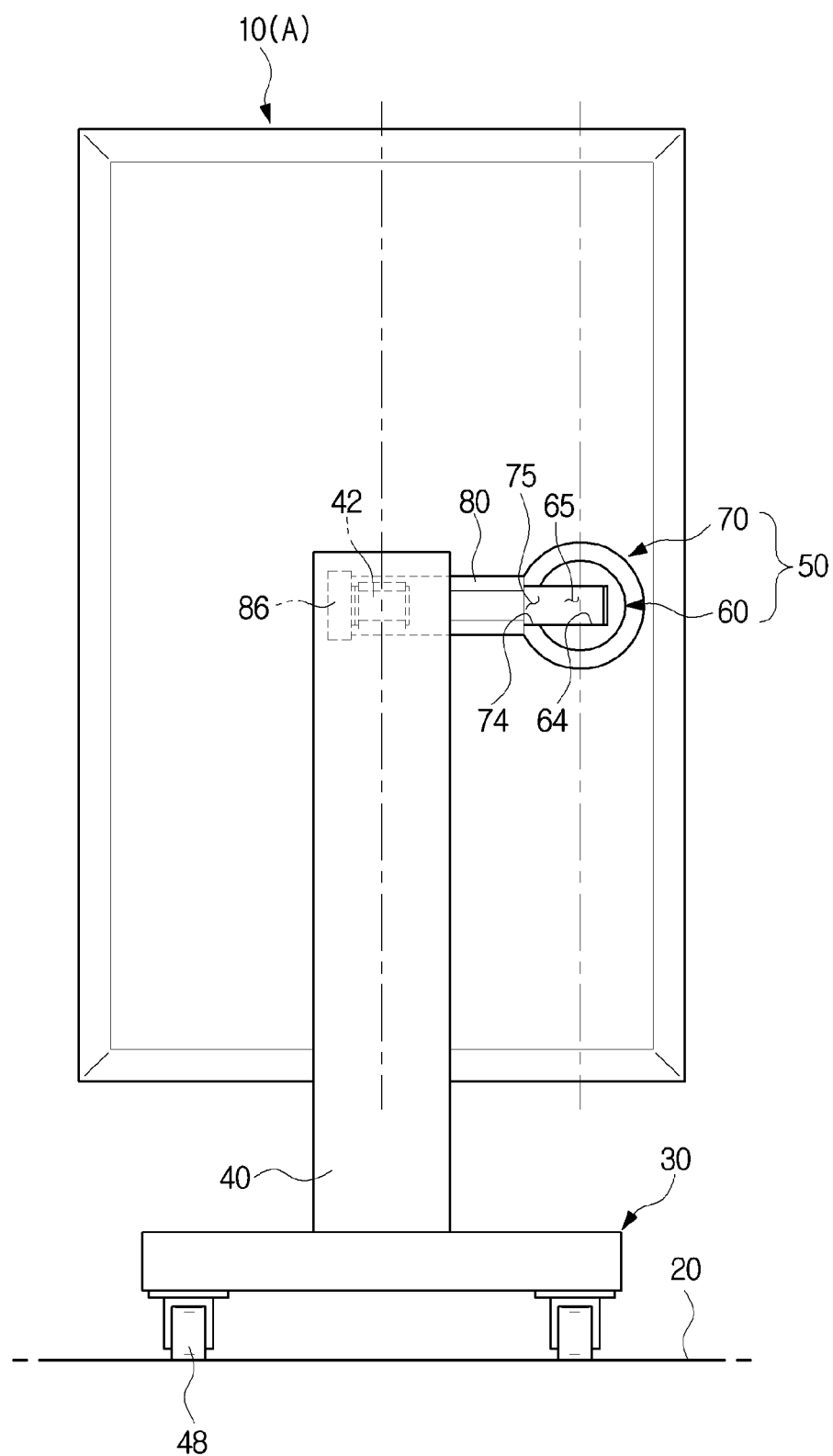
FIG. 7 is a rear view of a display apparatus according to an embodiment of the present disclosure.
Figure 8:
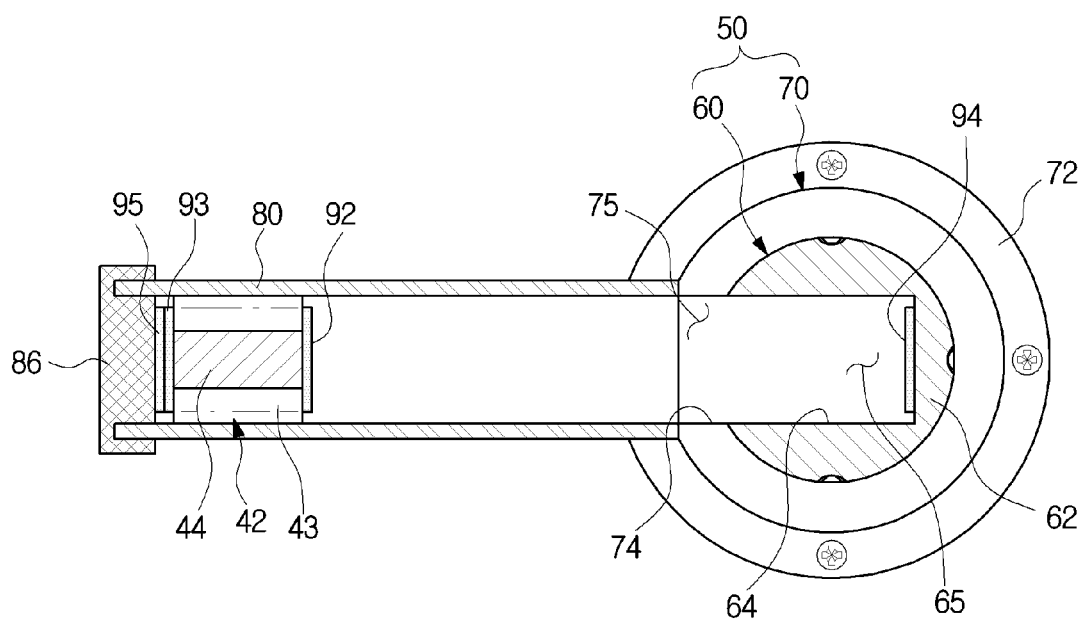
FIG. 8 shows a mounting device included in the display apparatus of FIGS. 6 and 7.
Figure 9:
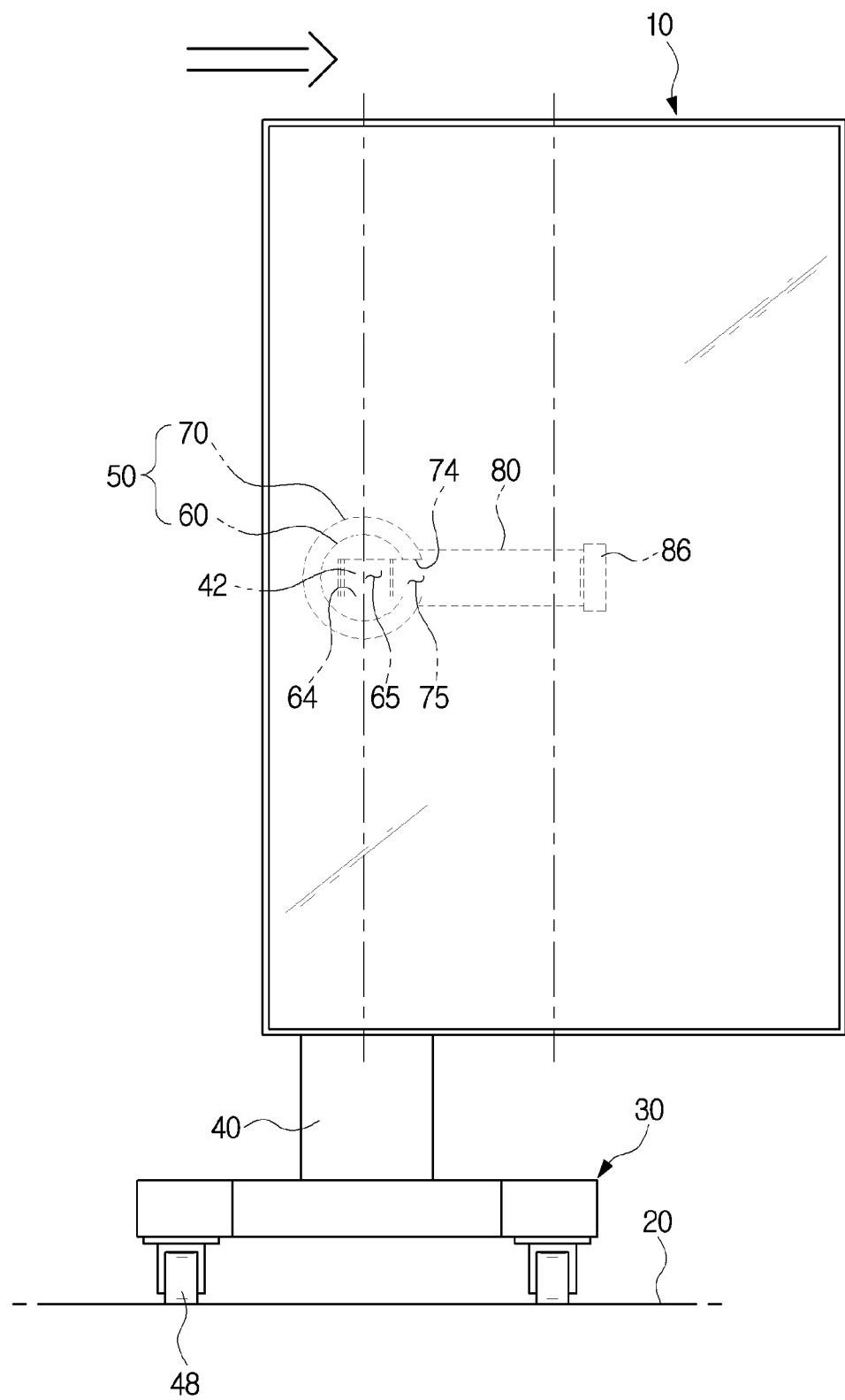
FIGS. 9 and 10 are views for describing operations of a display apparatus according to an embodiment of the present disclosure.
Figure 10:
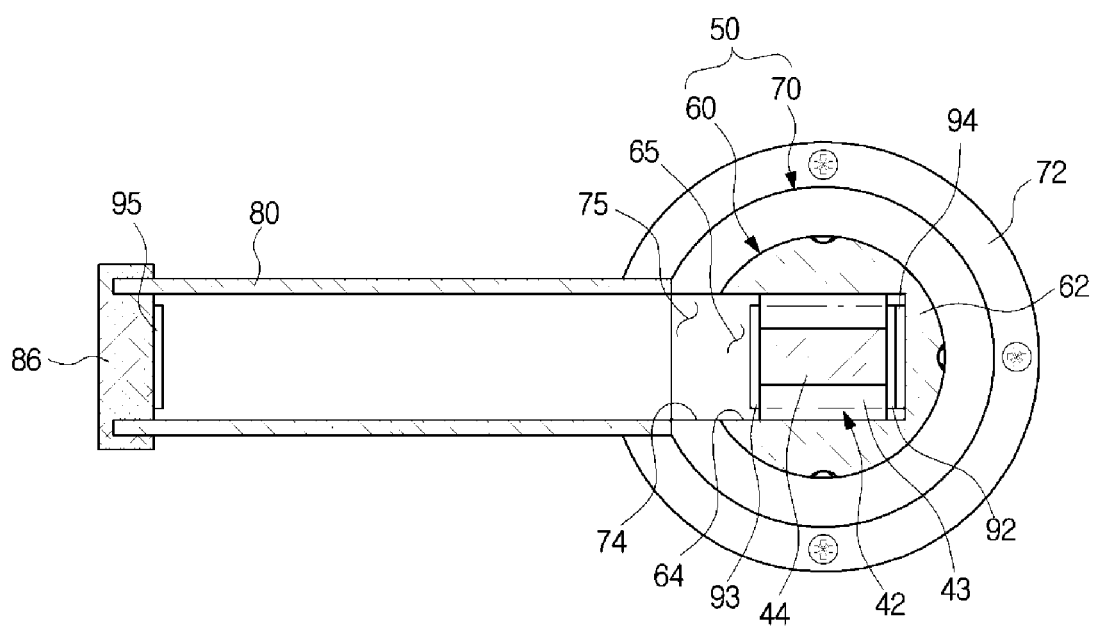
Figure 11:
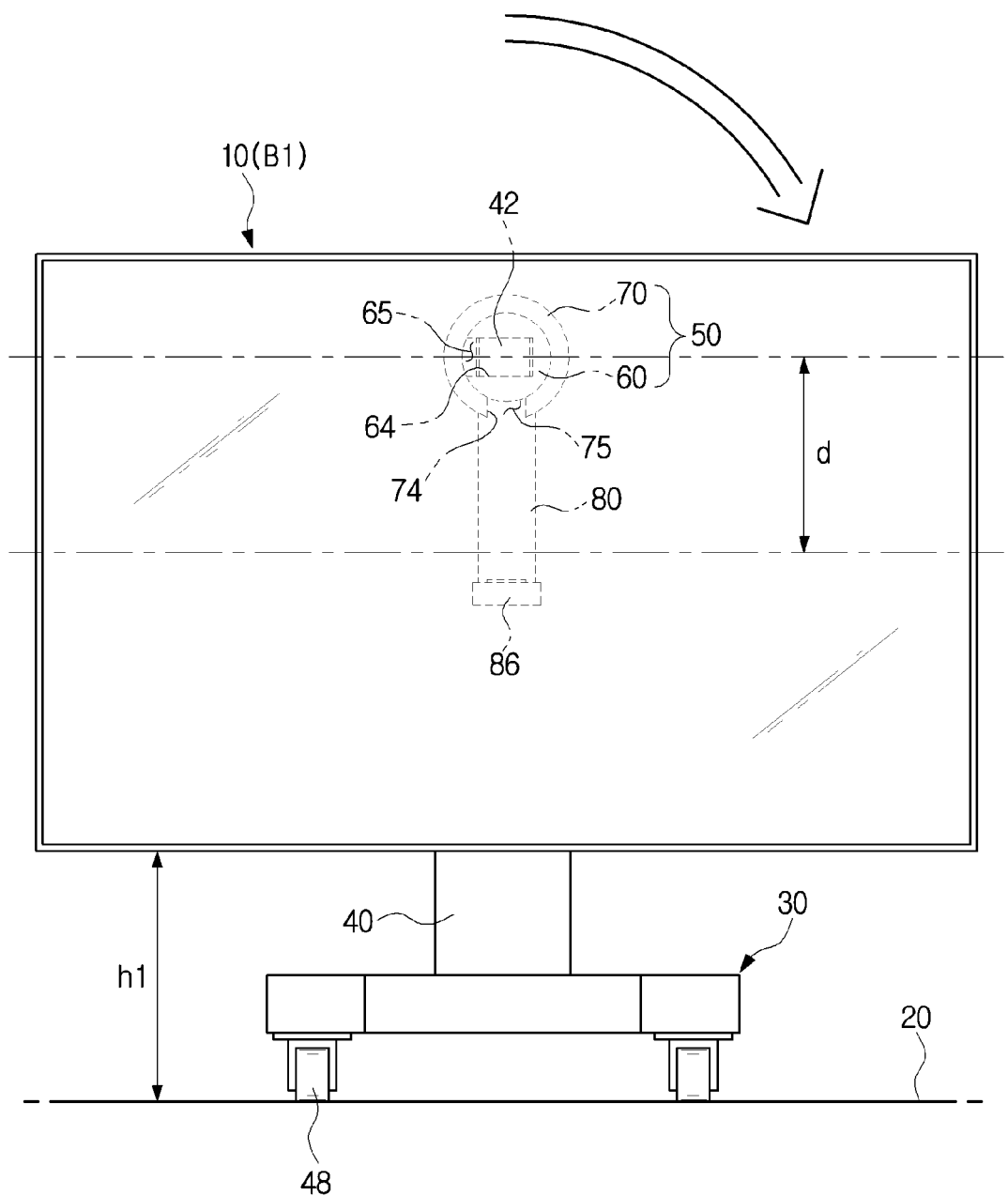
FIGS. 11 and 12 are views for describing operations of a display apparatus located in a first landscape mode according to an embodiment of the present disclosure.
Figure 12:
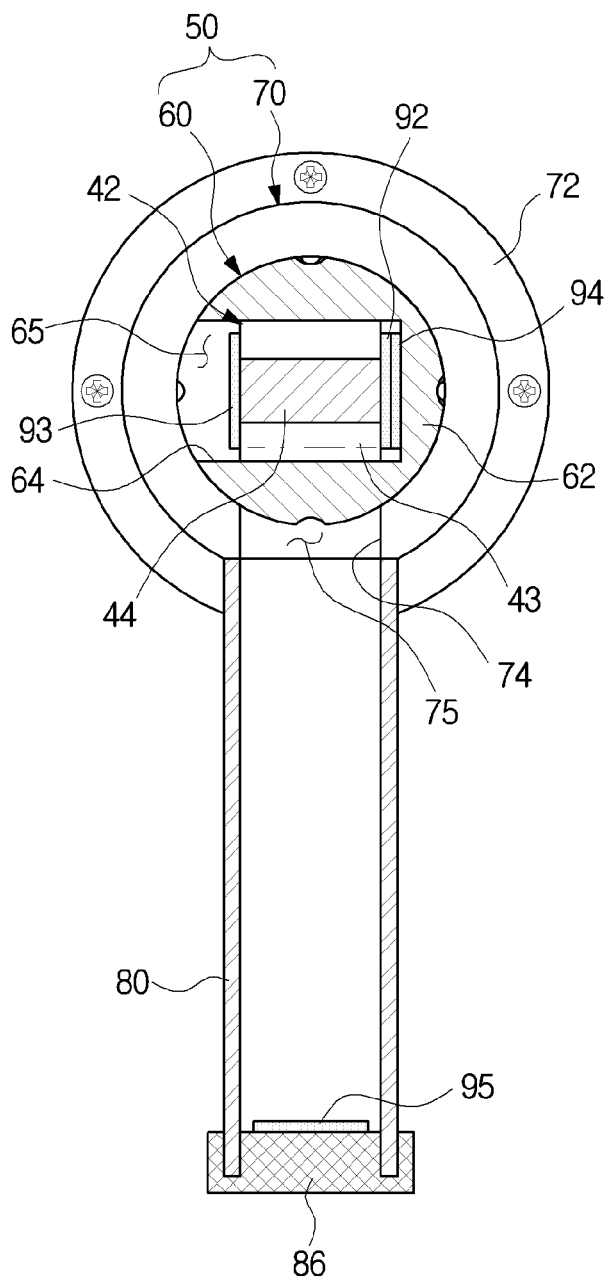
Figure 13:
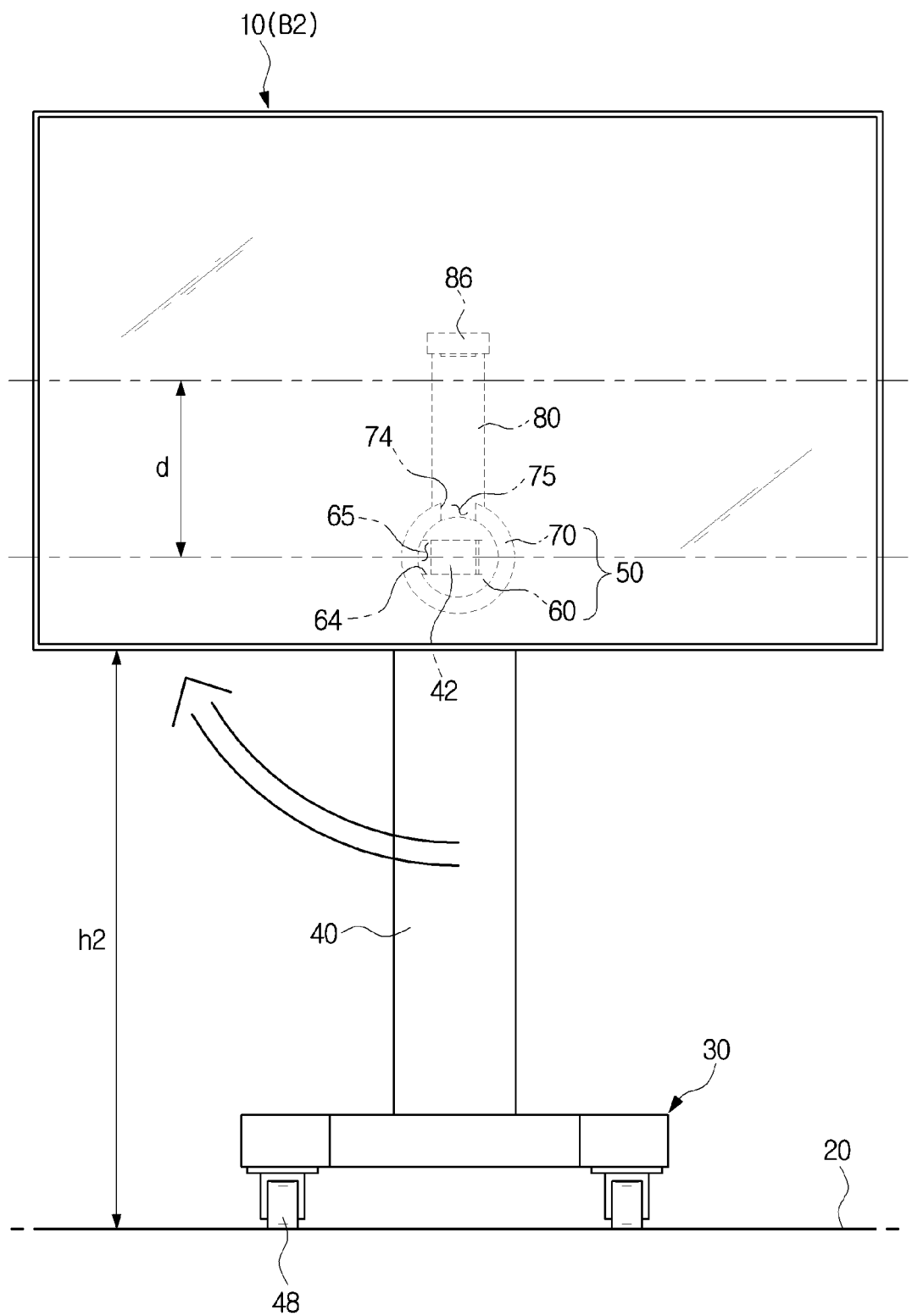
FIGS. 13 and 14 are view for describing operations of a display apparatus located in a second landscape mode according to an embodiment of the present disclosure.
Figure 14:
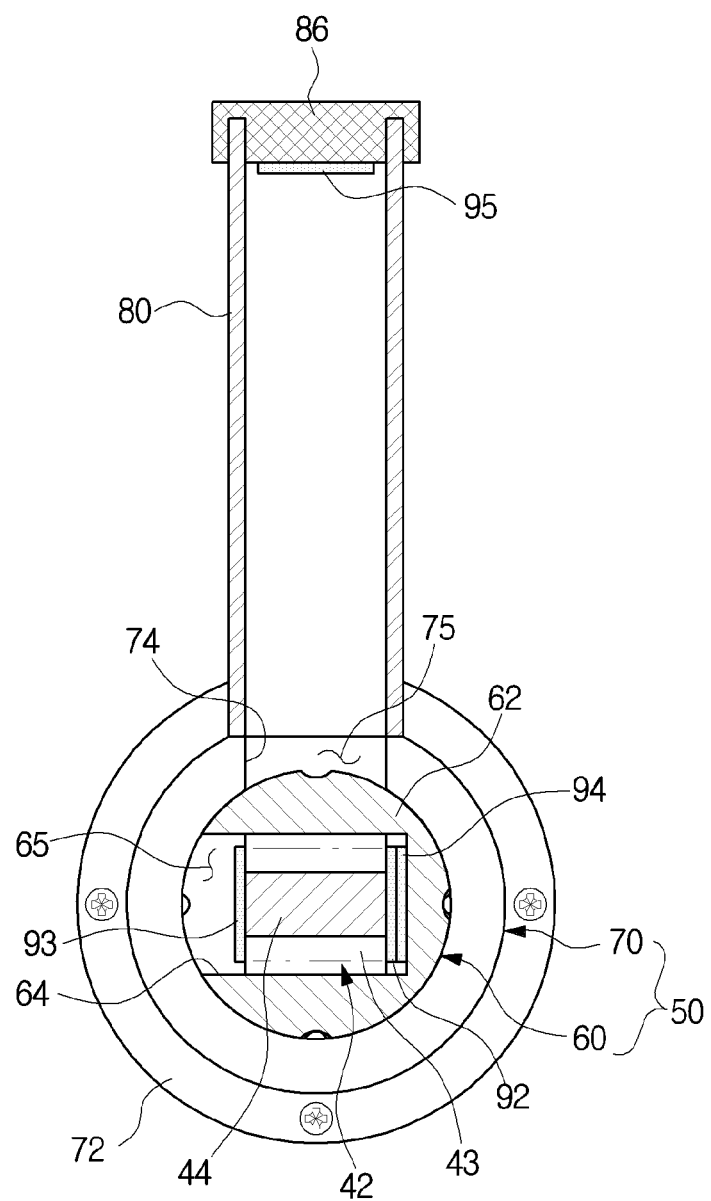

FIG. 6 is a front view of a display apparatus according to an embodiment of the present disclosure. FIG. 7 is a rear view of a display apparatus according to an embodiment of the present disclosure. FIG. 8 shows a mounting device included in the display apparatus of FIGS. 6 and 7. FIGS. 9 and 10 are views for describing operations of a display apparatus according to an embodiment of the present disclosure. FIGS. 11 and 12 are views for describing operations of a display apparatus located in a first landscape mode according to an embodiment of the present disclosure. FIGS. 13 and 14 are view for describing operations of a display apparatus located in a second landscape mode according to an embodiment of the present disclosure In FIGS. 6, 7, and 8, the display assembly 10 may be positioned in the portrait mode A. The supporting boss 42 may be located on the rail 80 to limit a rotation of the display assembly 10. That is, the display assembly 10 may operate in the portrait mode A.

The display assembly 10 may move horizontally so that the supporting boss 42 is inserted into the boss insertion portion 64 of the boss holder 60 from the rail 80, as shown in FIGS. 9 and 10. FIG. 10 shows a guide apparatus included in the display apparatus 10 shown in FIG. 9. The boss path 75 of the rotation holder 70 may be positioned between the rail 80 and the boss insertion portion 64. This may allow the supporting boss 42 to move from the rail 80 to the boss insertion portion 64 so that the display assembly 10 may move.

FIGS. 11 and 12 show the display assembly 10 rotated such that the rotation guide 50 is positioned above the assembly center C. FIG. 12 shows a guide apparatus included in the display apparatus 10 shown in FIG. 11. By rotating the display assembly 10 shown in FIGS. 9 and 10, the display assembly 10 may move from the portrait mode A to be positioned in a first landscape mode B1.

FIGS. 13 and 14 show the display assembly 10 rotated such that the rotation guide 50 is located below the assembly center C. FIG. 14 shows a guide apparatus included in the display apparatus 10 shown in FIG. 13. By rotating the display assembly 10 shown in FIGS. 9 and 10, the display assembly 10 may move from the portrait mode A to be positioned in a second landscape mode B2.

The first and second landscape modes B1 and B2 may have a height difference of twice the eccentric distance d of the rotation guide 50. When the height of the first landscape mode B1 is h1 and the height of the second landscape mode B2 is h2, h1+2d=h2. That is, since the display assembly 10 can be set to any one of the first and second landscape modes B1 and B2, the height of the display assembly 10 may be adjusted according to a user's need.

The supporting boss 42 may also be supported on the boss insertion portion 64 of the boss holder 60 so as to support the display assembly 10 on the stand 40. With the configuration, the weight of the display assembly 10 may be dispersed in a plane direction to the upper surface of the supporting boss 42, the inner surface of the boss insertion portion 64, and the outer surface of the boss holder 60. Thereby, the display assembly 10 may be stably supported.

In the first and second landscape modes B1 and B2, the rail 80 and the boss insertion portion 64 may be disconnected by the holder body 72 of the rotation holder 70 to prevent the display assembly 10 from moving arbitrarily in the straight line direction. Thus, the display assembly 10 may be stably supported by the stand 40.

Hereinafter, a power supply structure of the display apparatus according to the present disclosure will be described.

Figure 15:
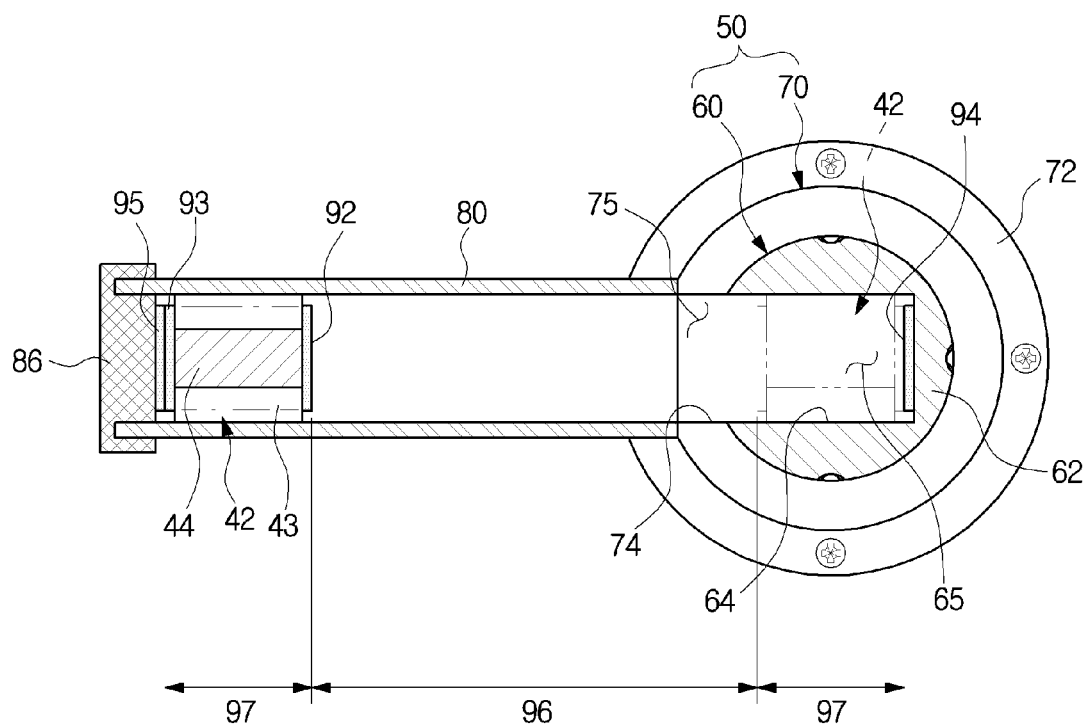
FIG. 15 shows a power supply of a display apparatus according to an embodiment of the present disclosure.

FIG. 15 shows a power supply of a display apparatus according to an embodiment of the present disclosure.

The mounting device 30 may include a power supply (not shown).

The power supply may be electrically connected to an external source to supply electrical energy to the display assembly 10.

The power supply may include boss terminals 92 and 93 provided on the supporting boss 42, and terminal coupling portions 94 and 95 electrically connected to the boss terminals 92 and 93.

A pair of boss terminals 92 and 93 may be disposed on both sides of the supporting boss 42, respectively. Also, a pair of terminal coupling portions 94 and 95 may be disposed on the boss stopper 86 and the boss insertion portion 64, respectively. That is, when the display assembly 10 is in the portrait mode A in this configuration, the boss terminal 93 of the supporting boss 42 may be coupled with the terminal coupling portion 95 located on the boss stopper 86 to supply electricity to the display assembly 10. When the display assembly 10 is in the landscape mode B, the boss terminal 92 of the supporting boss 42 may be coupled with the terminal coupling portion 94 located on the boss insertion portion 64 to supply electricity to the display assembly 10.

When the display assembly 10 is in the landscape mode B or in the portrait mode A, the boss terminals 92 and 93 may be coupled with the terminal coupling portions 94 and 95 to supply electricity. In this case, a section in which the supporting boss 42 is positioned is referred to as a supply section 97. The rail 80 may include the supply section 97 and a supply interruption section 96. That is, when the supporting boss 42 is positioned on the rail 80 in the process of converting between the landscape mode B and the portrait mode A, the boss terminals 92 and 93 and the terminal coupling portions 94 and 95 may form the supply interruption section 96.

With this configuration, electricity may be supplied to the display assembly 10 in the landscape mode B and the portrait mode A. That is, when the display assembly 10 is stably mounted on the mounting device 30, electricity may be supplied.

Hereinafter, a display apparatus according to another embodiment of the present disclosure will be described.

Hereinafter, a detailed description about the same components as those described above will be omitted.

Figure 16:
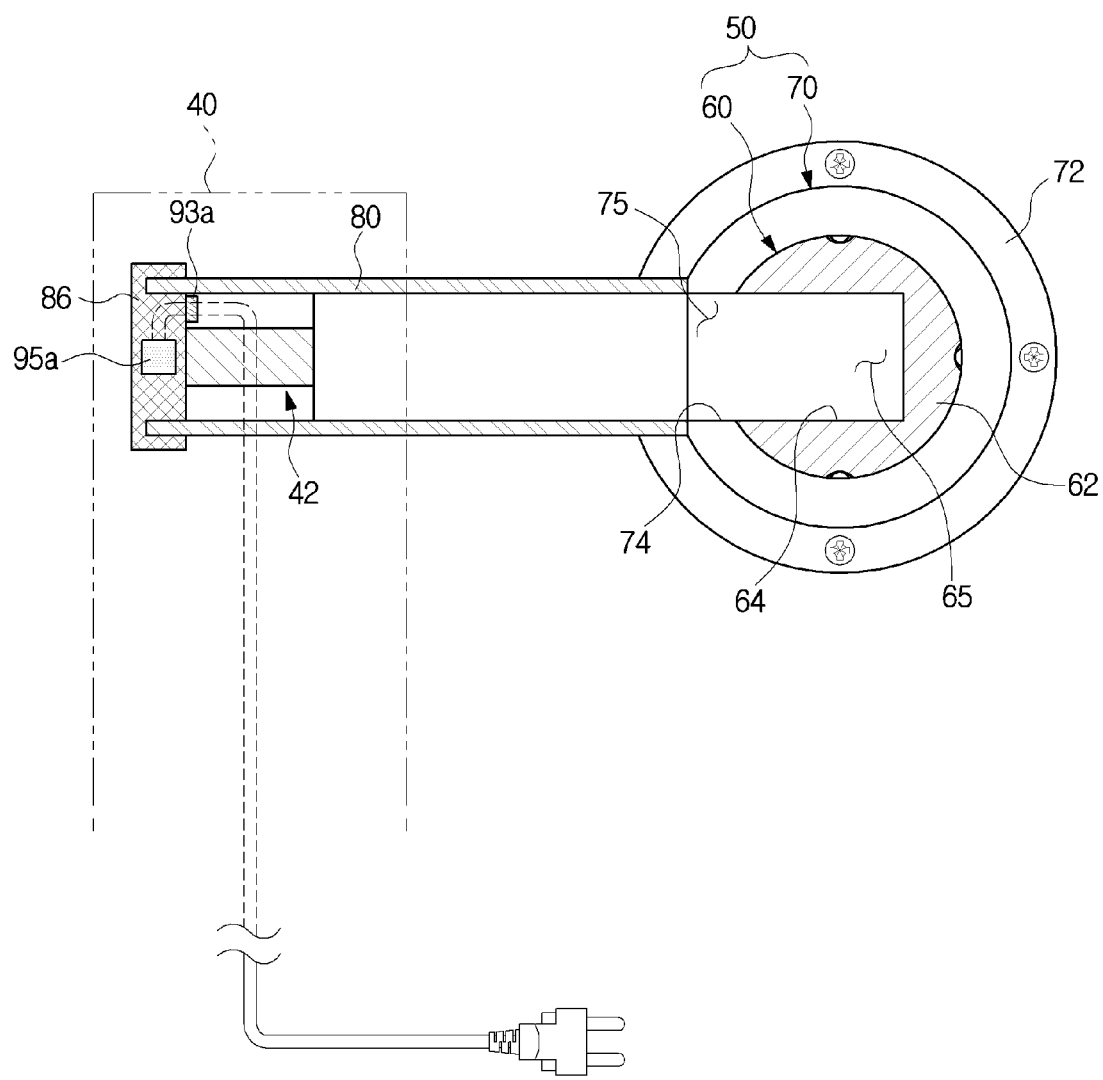
FIGS. 16, 17 and 18 show a power supply of a display apparatus according to another embodiment of the present disclosure.
Figure 17:
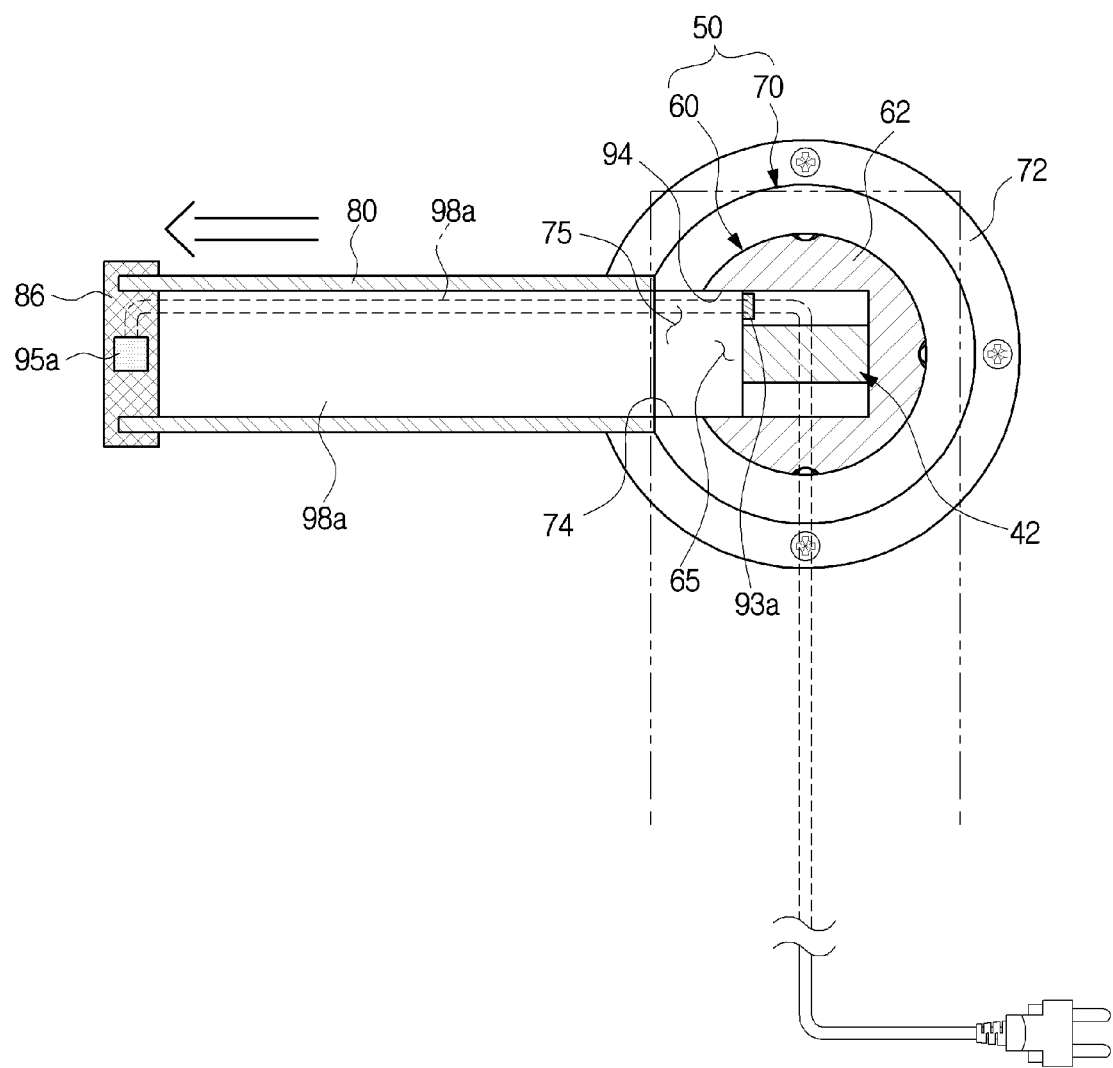
Figure 18:
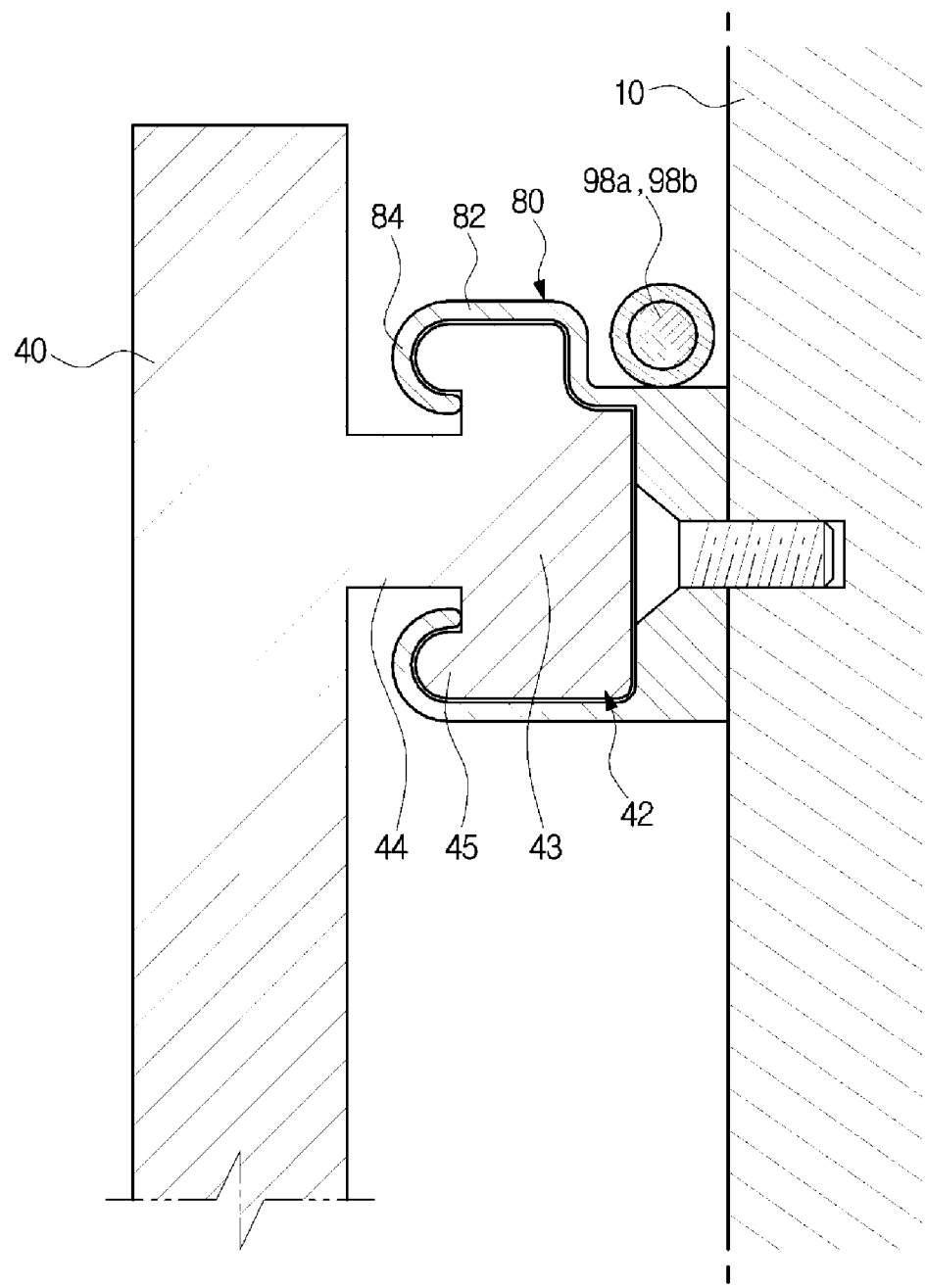
Figure 19:
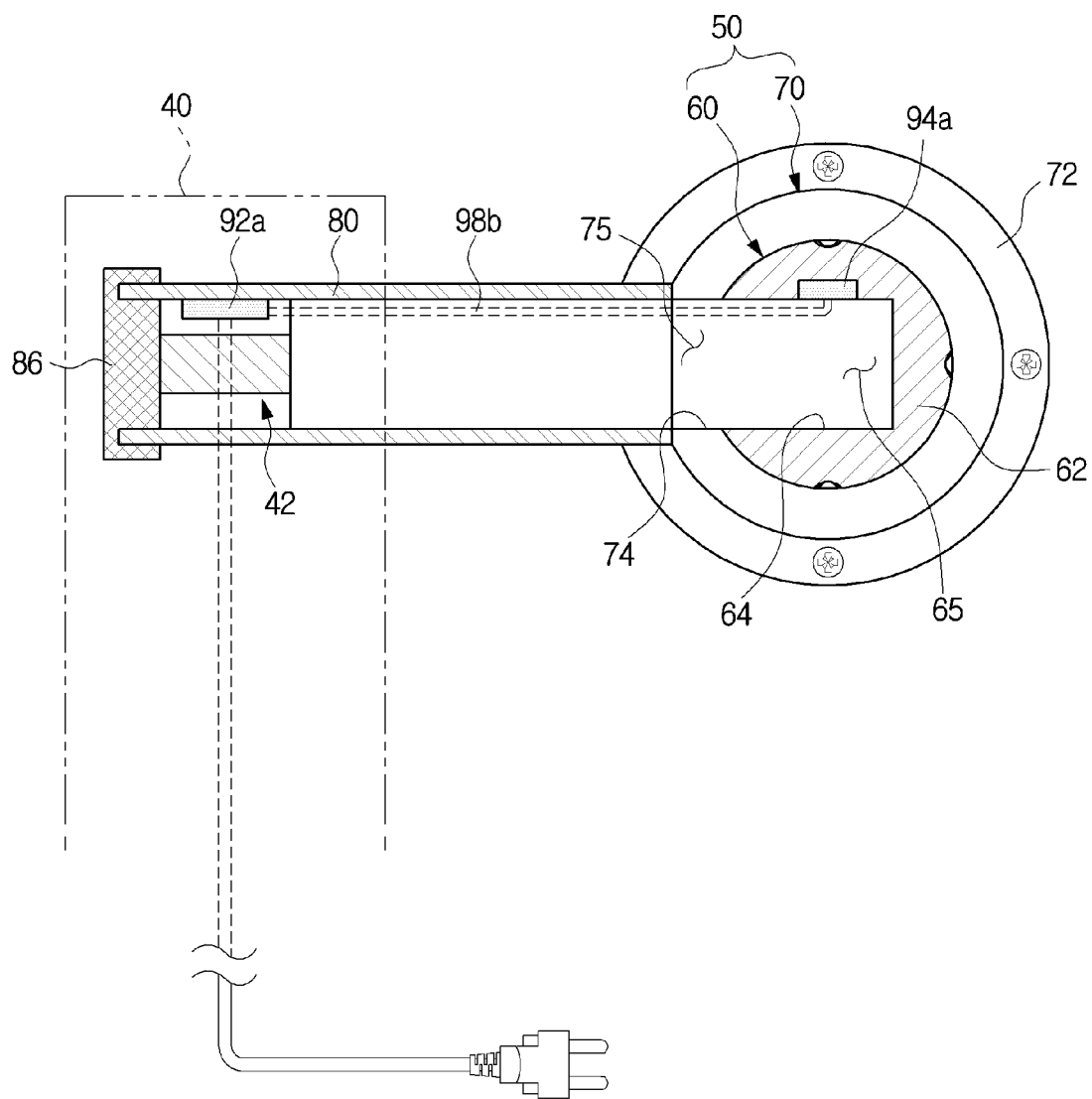
FIGS. 19 and 20 show a power supply of a display apparatus according to another embodiment of the present disclosure.
Figure 20:
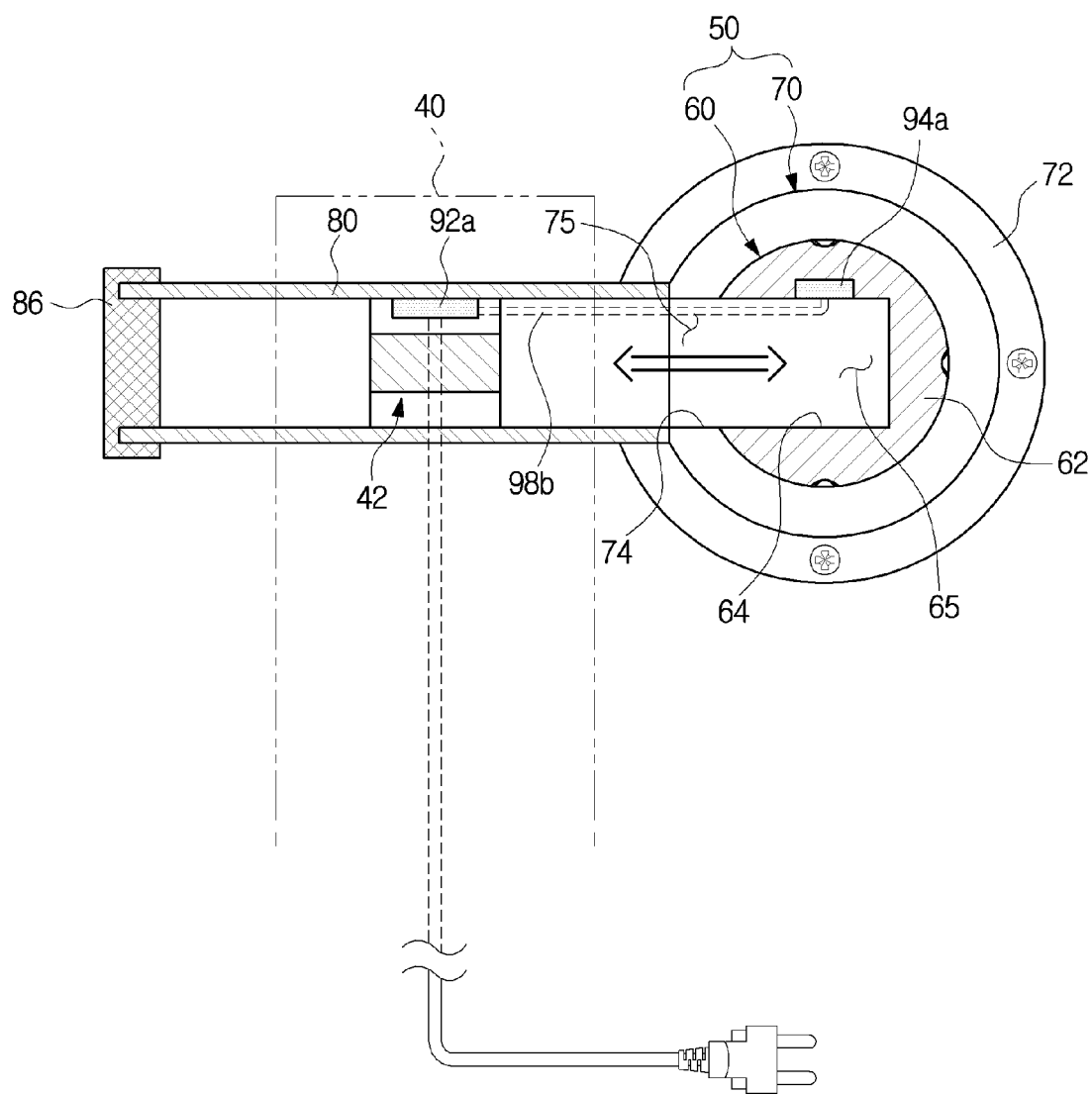

FIGS. 16, 17 and 18 show a power supply of a display apparatus according to another embodiment of the present disclosure. FIGS. 19 and 20 show a power supply of a display apparatus according to another embodiment of the present disclosure.

A power supply 90 may be electrically connected to an external source to supply electrical energy to the display assembly 10.

The power supply device 90 may include boss terminals 92a and 93a provided on the supporting boss 42, terminal coupling portions 94a and 95a electrically connected to the boss terminals 92a and 93a, and terminal connecting portions 98a and 98b connecting the boss terminals 92a 93a to the terminal coupling portions 94a and 95a.

The boss terminals 92a and 93a may be disposed on the supporting boss 42.

As shown in FIGS. 16 and 17, the terminal coupling portion 95a may be disposed on the boss stopper 86, and electrically connected to the boss terminal 93a provided on the supporting boss 42 through the terminal connecting portion 98a. As shown in FIGS. 19 and 20, the terminal coupling portion 94a may be disposed on the boss insertion portion 64, and electrically connected to the boss terminal 92a provided on the supporting boss 42 through the terminal connecting portion 98b.

The terminal connecting portions 98a and 98b may include wires that electrically connect the boss terminals 92a and 93a to the terminal coupling portions 94a and 95a. It may be possible to supply electricity to the display assembly 10 through the terminal connecting portions 98a and 98b without electrical interruption even if the display assembly 10 horizontally moves or rotates. Thereby, it may be possible to locate the display assembly 10 at more various positions.

The terminal connecting portions 98a and 98b may be disposed on one side of the rail 80, as shown in FIG. 18, without being exposed to the outside. However, the location of the terminal connecting portions 98a and 98b is not limited thereto. For example, the terminal connecting portions 98a and 98b may be inserted into the display assembly 10.

Hereinafter, a display apparatus according to another embodiment of the present disclosure will be described.

Hereinafter, a detailed description about the same components as those described above will be omitted.

Figure 21:
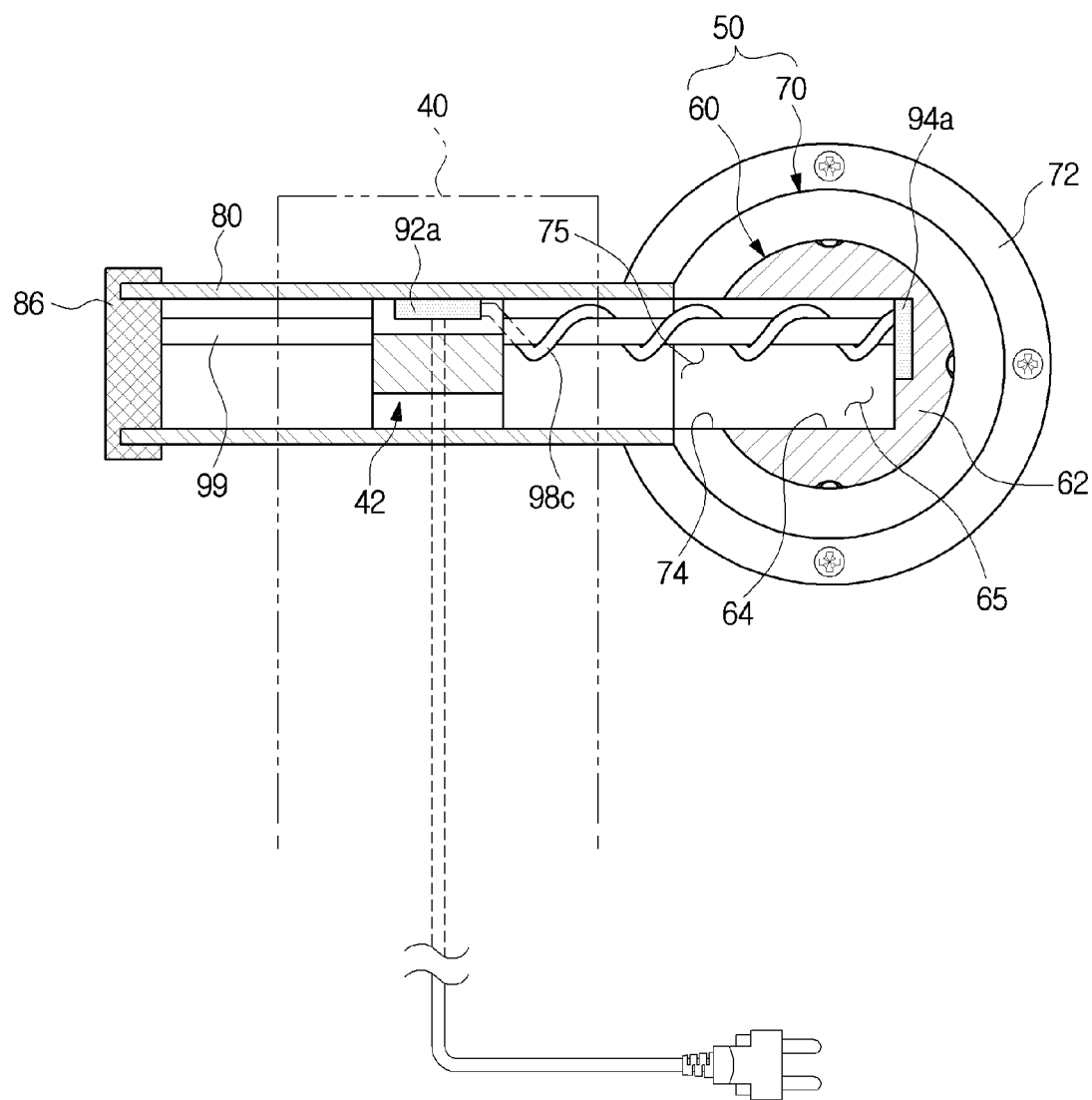
FIG. 21 shows a power supply of a display apparatus according to another embodiment of the present disclosure.

FIG. 21 is a view of a power supply device of a display apparatus according to another embodiment of the present disclosure.

The power supply 90 may further include a supporting rod 99. The supporting rod 99 may be provided so that a terminal connecting portion 98c can be disposed without being twisted. The supporting rod 99 may be located on the rear, inner surface of the display assembly 10. The terminal connecting portion 98c may be spirally wound around the supporting rod 99.

With such a configuration, even when the distance between the boss terminal 92a and the terminal coupling portion 94a varies according to a movement of the display assembly 10, the terminal connecting portion 98c may supply electricity without being twisted.

Hereinafter, a display apparatus according to another embodiment of the present disclosure will be described.

Hereinafter, a detailed description about the same components as those described above will be omitted.

FIGS. 22 to 25 are views for describing operations of a display apparatus according to another embodiment of the present disclosure.

The rotation guide 50 may be spaced apart from the assembly center C of the display assembly 10.

A horizontal center line passing through the assembly center C is referred to as a first center line L1, and a vertical center line passing through an assembly center is referred to as a second center line L2.

The rotation guide 50 may be spaced an eccentric distance d apart from the assembly center C. That is, the rotation guide 50 may be located at an eccentric position. In the current embodiment, the rotation guide 50 may be spaced along the first center line L1 from the assembly center C.

Figure 22:
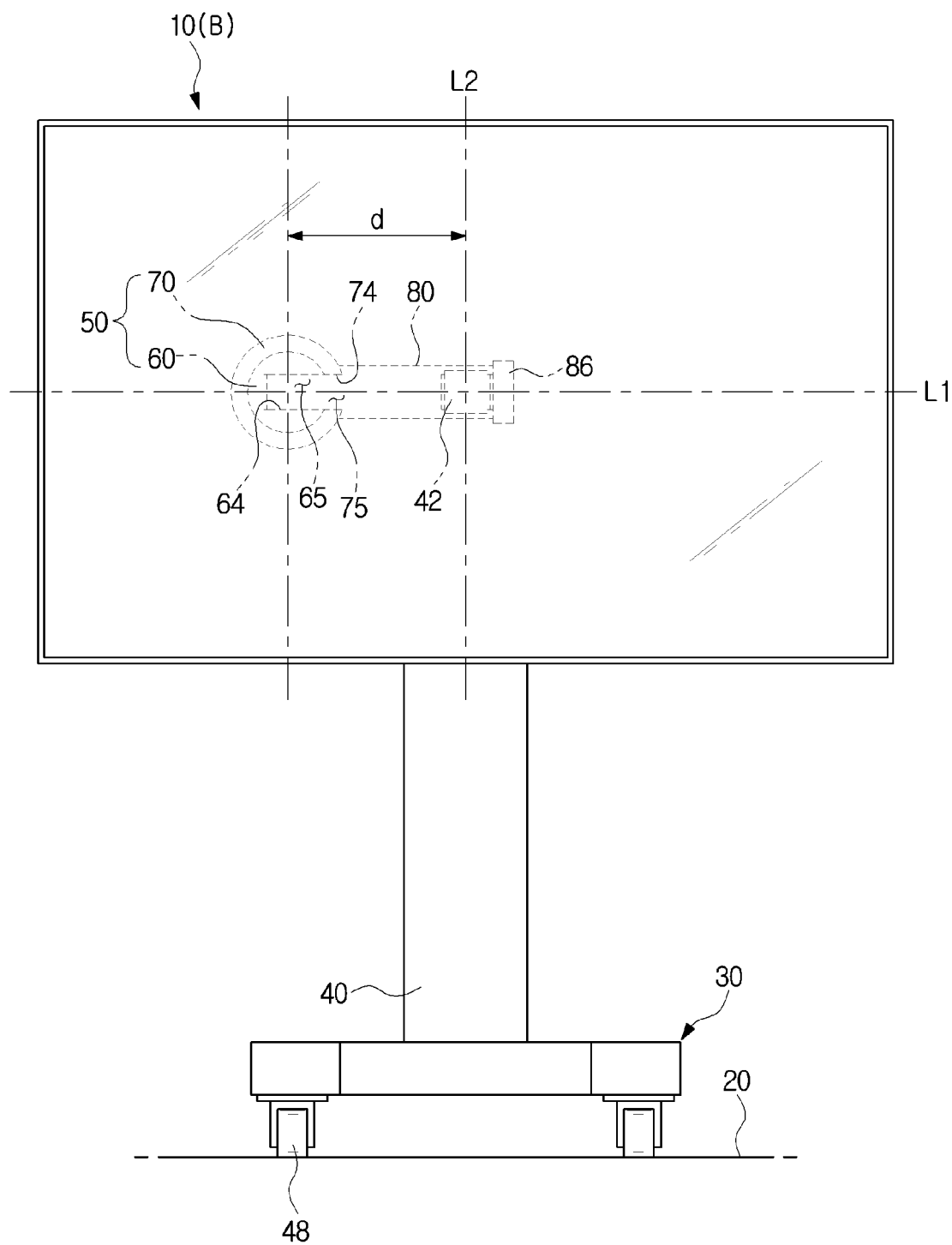
FIGS. 22 to 25 are views for describing operations of a display apparatus according to another embodiment of the present disclosure.

As shown in FIG. 22, the supporting boss 42 may be positioned on the rail 80 to prevent the display assembly 10 from rotating. That is, the display assembly 10 may operate in the landscape mode B.

Figure 23:
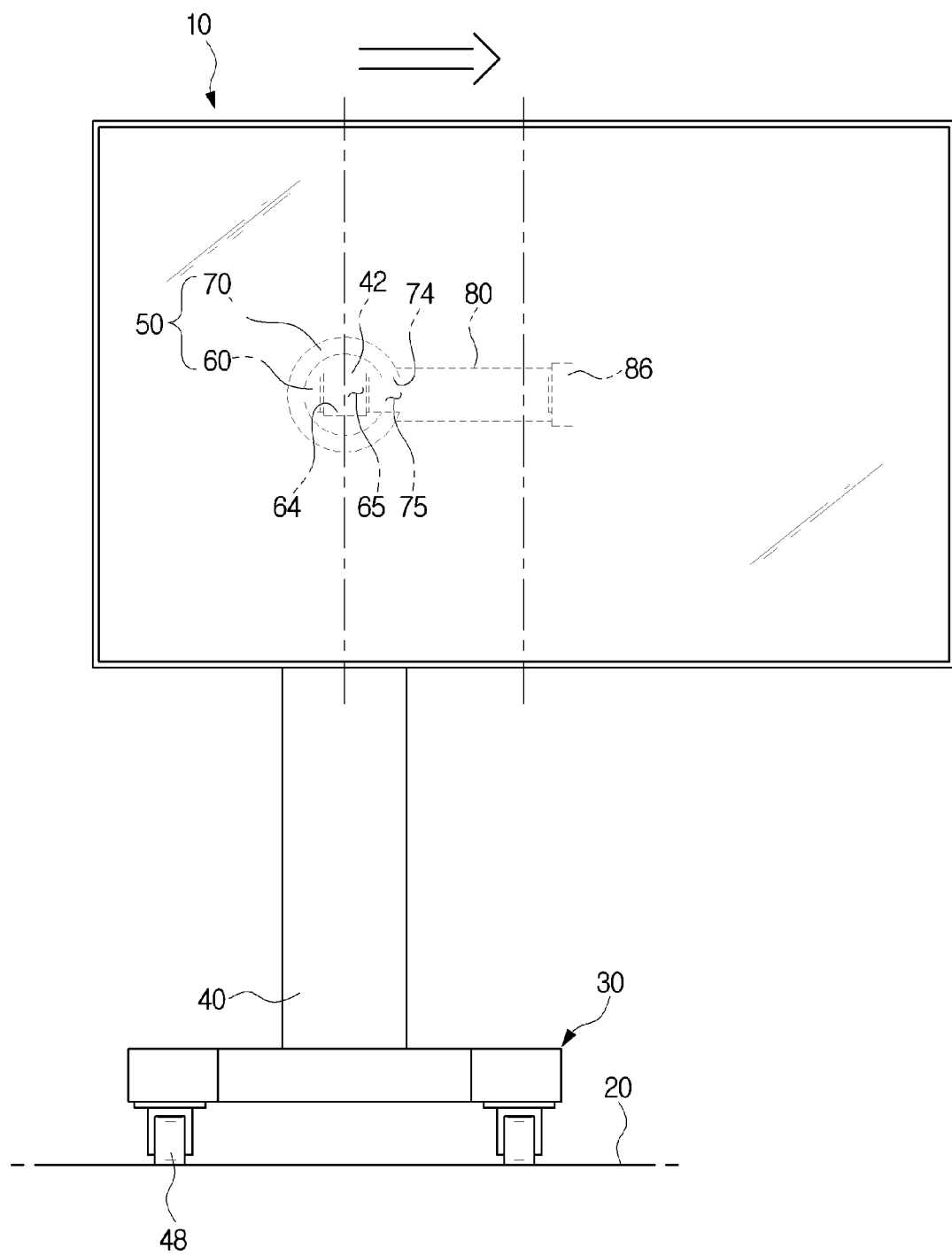

The display assembly 10 may move horizontally so that the supporting boss 42 is inserted into the boss insertion portion 64 of the boss holder 60 from the rail 80, as shown in FIG. 23.

Figure 24:
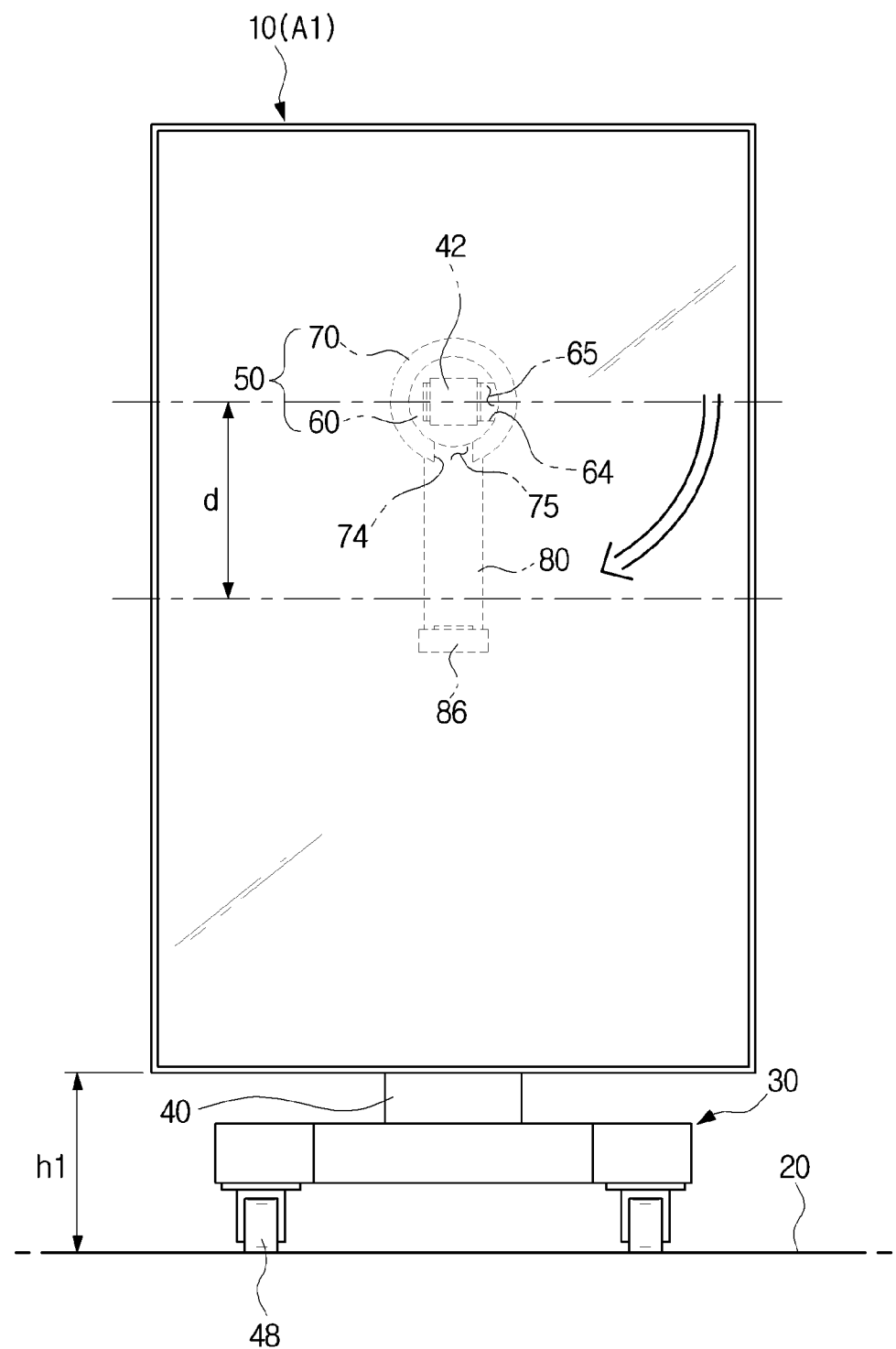

FIG. 24 shows the display assembly 10 rotated such that the rotation guide 50 is located above the assembly center C. With this operation, the display assembly 10 may move from the landscape mode B to be positioned in a first portrait mode A1.

Figure 25:
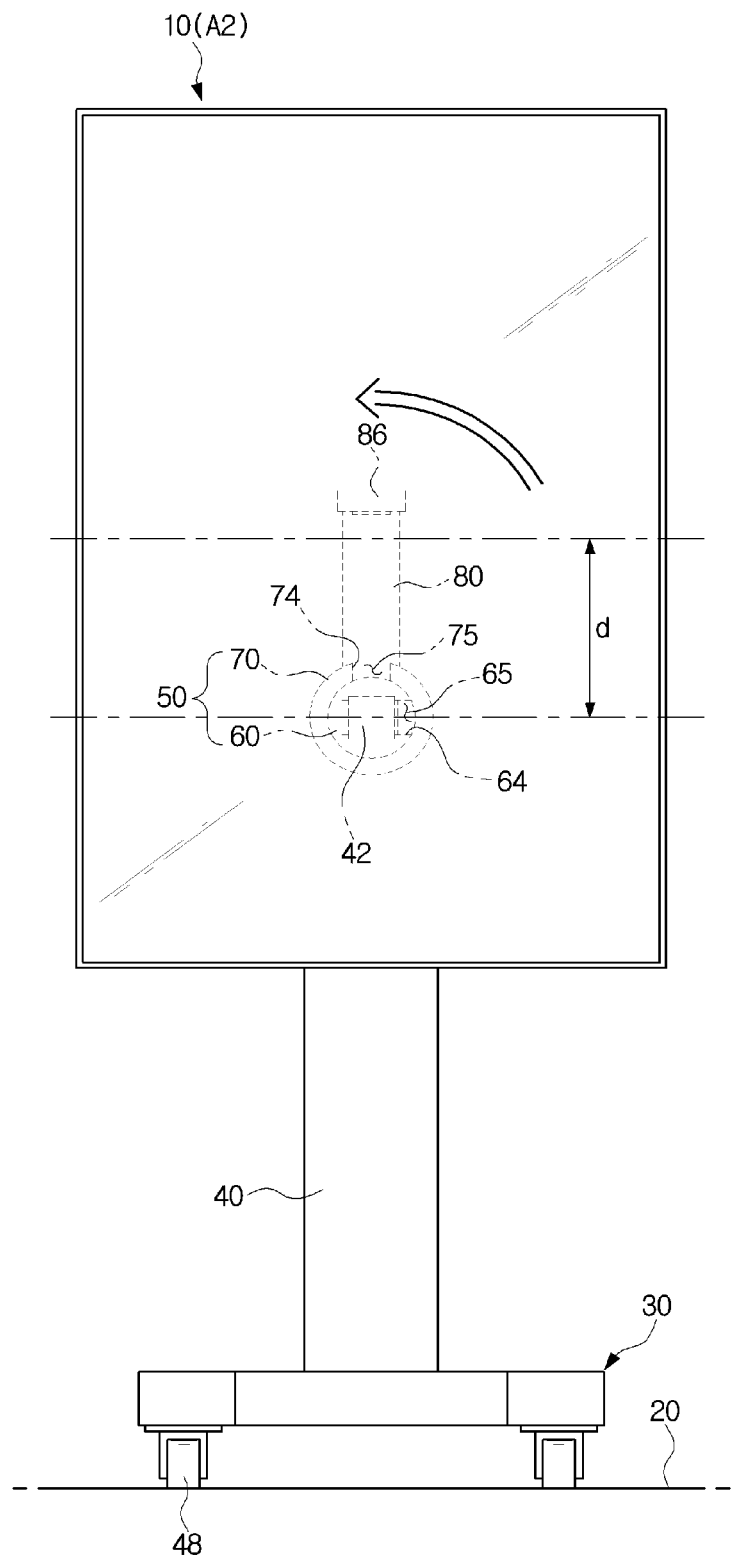

FIG. 25 shows the display assembly 10 rotated so that the rotation guide 50 is located below the assembly center C. With this operation, the display assembly 10 may move from the landscape mode B to be positioned in the second portrait mode A2.

The first and second portrait modes A1 and A2 may have a height difference of twice the eccentric distance d of the rotation guide 50. When the height of the first portrait mode A1 is h1 and the height of the second portrait mode A2 is h2, h1+2d=h2. That is, since the display assembly 10 can be set to any one portrait mode of the first and second portrait modes A1 and A2, the height of the display assembly 10 may be adjusted.

Hereinafter, a display apparatus according to another embodiment of the present disclosure will be described.

Hereinafter, a detailed description about the same components as those described above will be omitted.

FIGS. 26 to 30 are views for describing operations of a display apparatus according to another embodiment of the present disclosure.

The mounting device 130 may include rotation guides 151 and 152 and a rail 180.

The rotation guides 151 and 152 may be spaced apart from the assembly center C of the display assembly 10.

When the display assembly 10 is in the landscape mode B, a horizontal center line passing the assembly center C is referred to as a first center line L1, and a vertical center line passing the assembly center C is referred to as a second center line L2.

The rotation guides 151 and 152 may be spaced apart from the assembly center C by eccentric distances d1 and d2, respectively.

The rotation guides 151 and 152 may have a first rotation guide 151 disposed eccentrically at a first distance d1 in one direction from the assembly center C, and a second rotation guide 151 disposed eccentrically at a second distance d2 in the other direction from the assembly center C. The first distance d1 may be different from the second distance d2. In the current embodiment, the first distance d1 may be shorter than the second distance d2.

The first and second rotation guides 50 may be disposed on the second center line L2.

The rail 80 may move the display assembly 10 in a straight line direction. The rail 80 may be disposed on the rear surface of the display assembly 10. The straight line direction may include a horizontal direction and a vertical direction with respect to the display assembly 10. In the current embodiment, a configuration in which the display assembly 10 moves along the second center line L2 through the rail 80 will be described. The rail 80 may connect the first rotation guide 151 to the second rotation guide 152.

Figure 26:
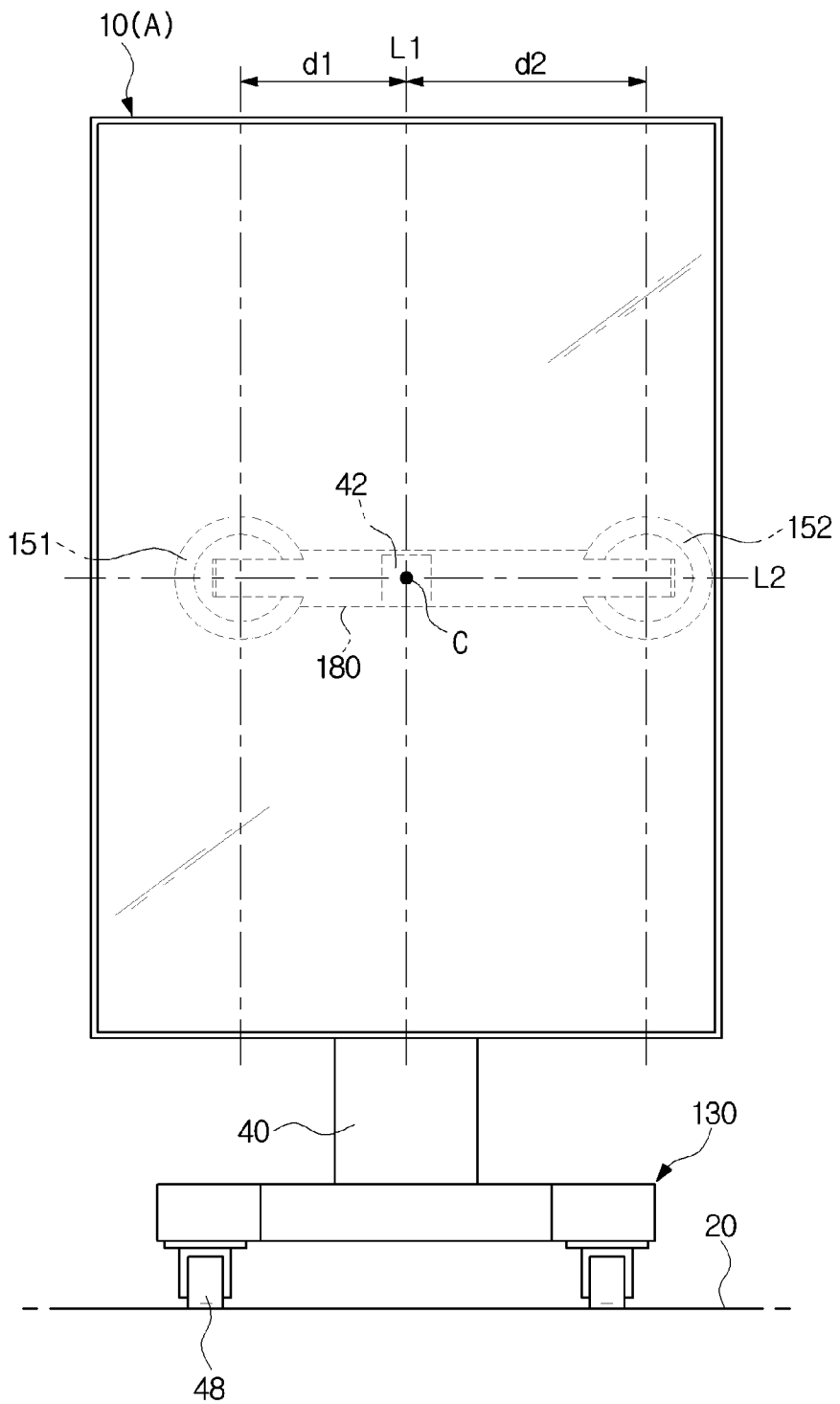
FIGS. 26 to 30 are views for describing operations of a display apparatus according to another embodiment of the present disclosure.

In FIG. 26, the display assembly 10 may be positioned in the portrait mode A. The supporting boss 42 may be located on the rail 80 to prevent the display assembly 10 from rotating. That is, the display assembly 10 may operate in the portrait mode A.

Figure 27:
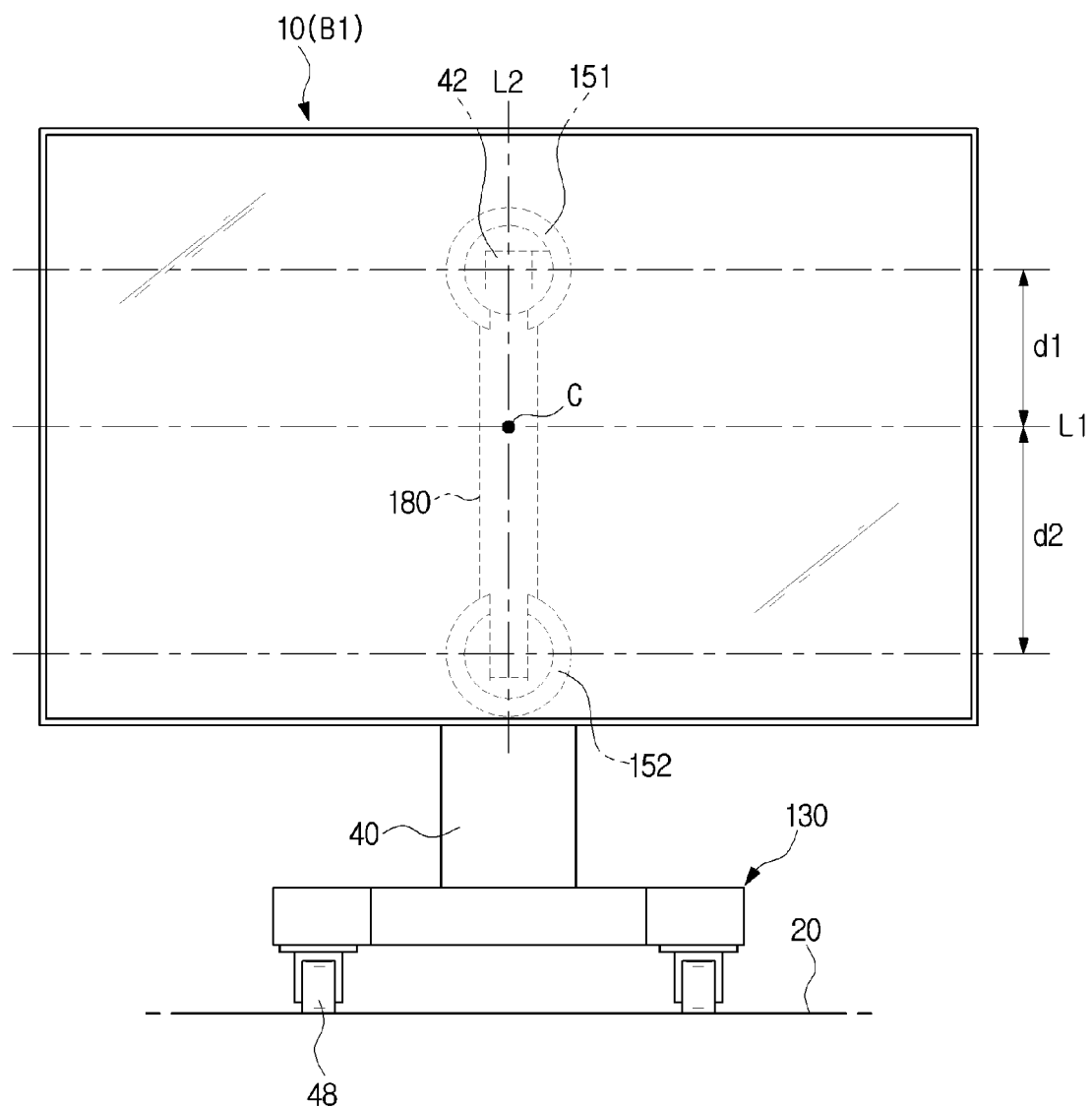

The display assembly 10 may move horizontally such that the supporting boss 42 is inserted into the first rotation guide 151 at the rail 80. Thereafter, the display assembly 10 may rotate such that the first rotation guide 151 is positioned above the assembly center C, as shown in FIG. 27. Thereby, the display assembly 10 may move from the portrait mode A to be positioned in the first landscape mode B1.

Figure 28:
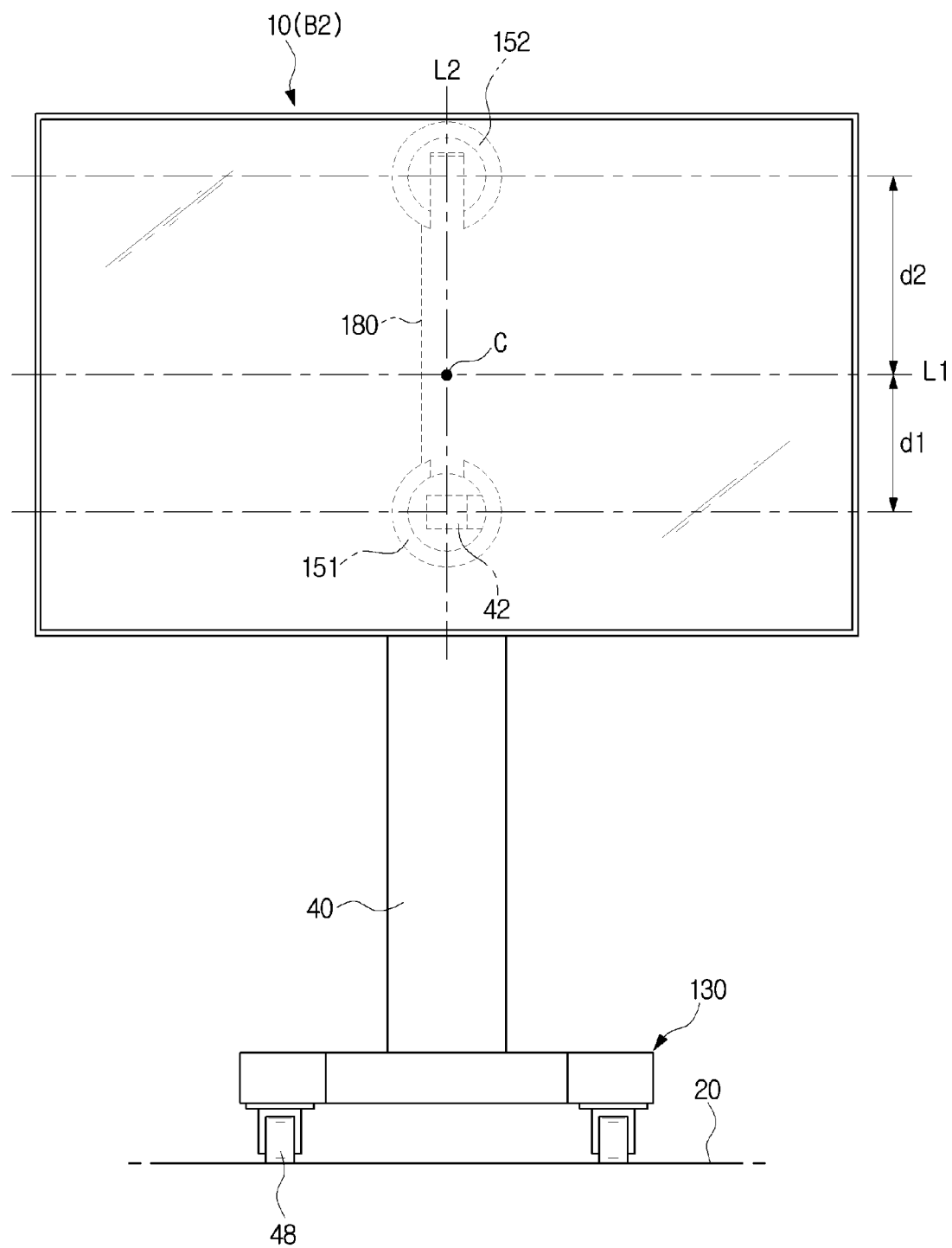

FIG. 28 shows the display assembly 10 rotated such that the first rotation guide 151 is located below the assembly center C. The display assembly 10 may move from the portrait mode A to be positioned in the second landscape mode B2.

Figure 29:
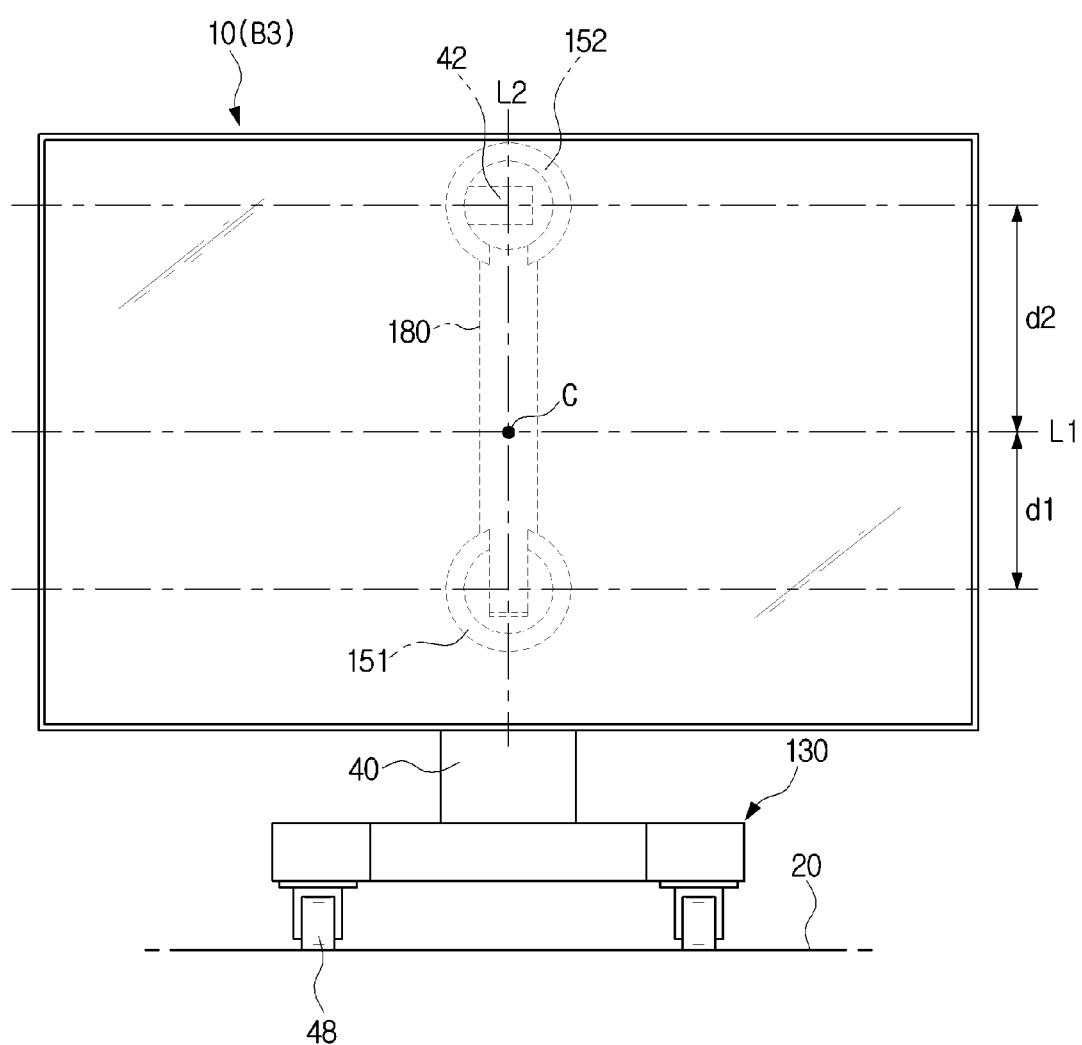

As shown in FIG. 26, the display assembly 10 may move horizontally such that the supporting boss 42 is inserted into the second rotation guide 152 from the rail 80. Thereafter, the display assembly 10 may rotate such that the second rotation guide 152 is positioned above the assembly center C, as shown in FIG. 29. Thereby, the display assembly 10 may move from the portrait mode A to be positioned in the third landscape mode B3.

Figure 30:
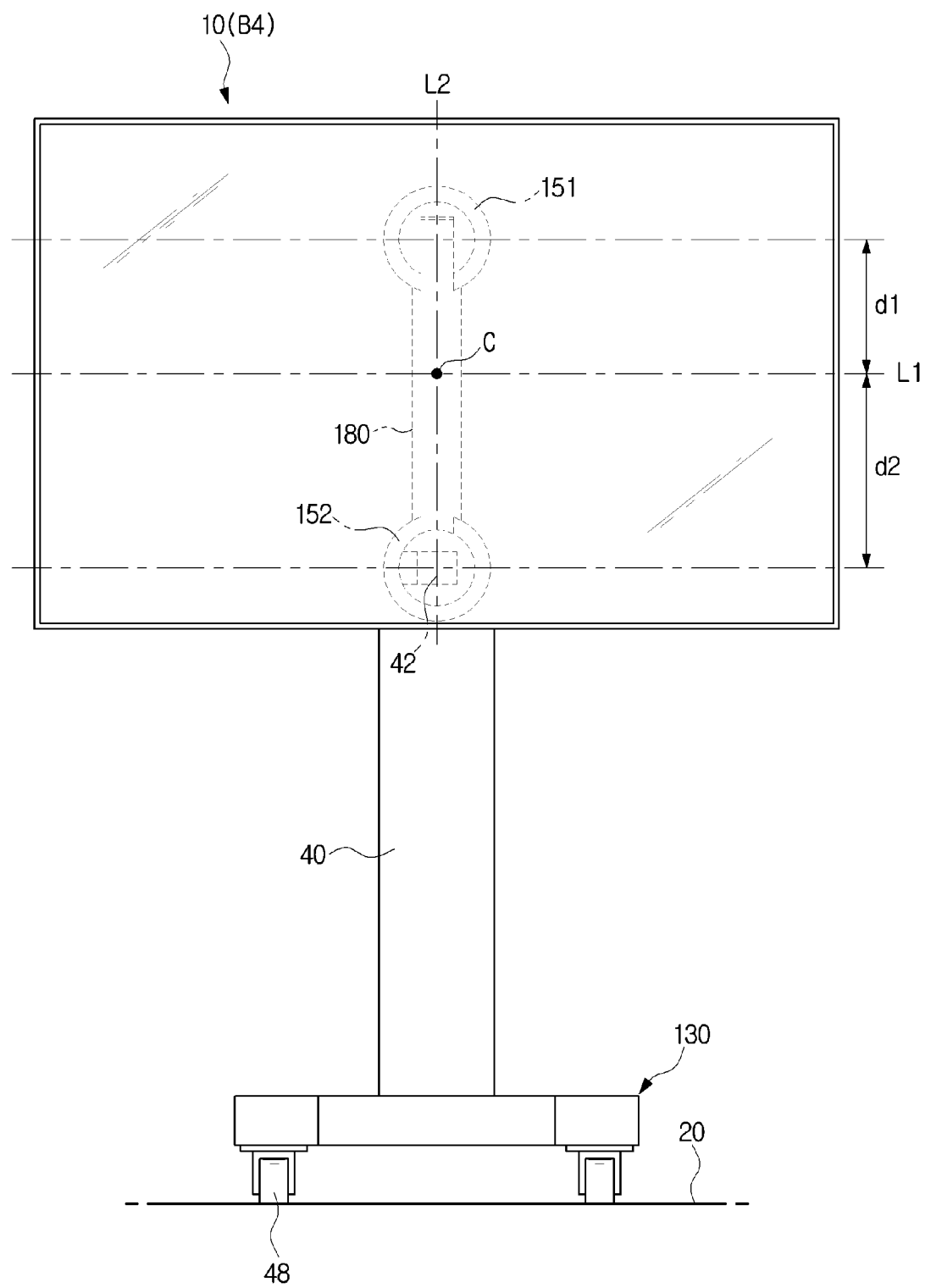

FIG. 30 shows the display assembly 10 rotated such that the rotation guide 50 is located below the assembly center C. The display assembly 10 may move from the portrait mode A to be positioned in a fourth landscape mode B4.

The first and second landscape modes B1 and B2 may operate by a rotation by the first rotation guide 151, and the third and fourth landscape modes B3 and B4 may operate by a rotation by the second rotation guide 152.

In this embodiment, since the first distance d1 is shorter than the second distance d2, a height difference between the first and second landscape modes B1 and B2 may be smaller than that between the third and fourth landscape modes B3 and B4. That is, the first and second rotation guides 151 and 152 may have different eccentric distances d from the assembly center C, respectively. Therefore, the user may adjust the height of the display assembly 10 by selectively rotating any one of the first and second rotation guides 151 and 152 as needed. When the mounting surface 20 on which the stand 40 is installed is a bottom surface, heights of the landscape modes B1 to B4 from the bottom surface may be lowered in the order of the fourth landscape mode B4, the second landscape mode B2, the first landscape mode B1, and the third landscape mode B3.

Hereinafter, a display apparatus according to another embodiment of the present disclosure will be described.

Hereinafter, a detailed description about the same components as those described above will be omitted.

FIGS. 31 to 40 are views for describing operations of a display apparatus according to another embodiment of the present disclosure.

FIGS. 32, 34, 36, 38 and 40 show the guide apparatus included in the display apparatus 10 shown in FIGS. 31, 33, 35, 37 and 39.

The mounting device 30 may include a rotation guide 250 and a rail 280.

The rotation guide 250 may be spaced apart from the assembly center C of the display assembly 10.

In the current embodiment, the rotation guide 250 may be spaced apart from the first center line L1 and the second center line L2 with respect to the assembly center C.

The rotation holder 270 may include a holder body 272 disposed along the circumference of the boss holder 60, and path forming portions 274a and 274b forming boss paths 275a and 275b connecting the rail 280 to the boss insertion portion 64.

The boss paths 275a and 275b may include a first boss path 275a and a second boss path 275b.

The rail 280 may move the display assembly 10 in a straight line direction. The rail 280 may be disposed on the rear surface of the display assembly 10. The straight line direction may include a horizontal direction and a vertical direction with respect to the display assembly 10. In the current embodiment, a configuration in which the display assembly 10 moves in parallel to the first and second center lines L1 and L2 through the rail 280 will be described.

Figure 31:
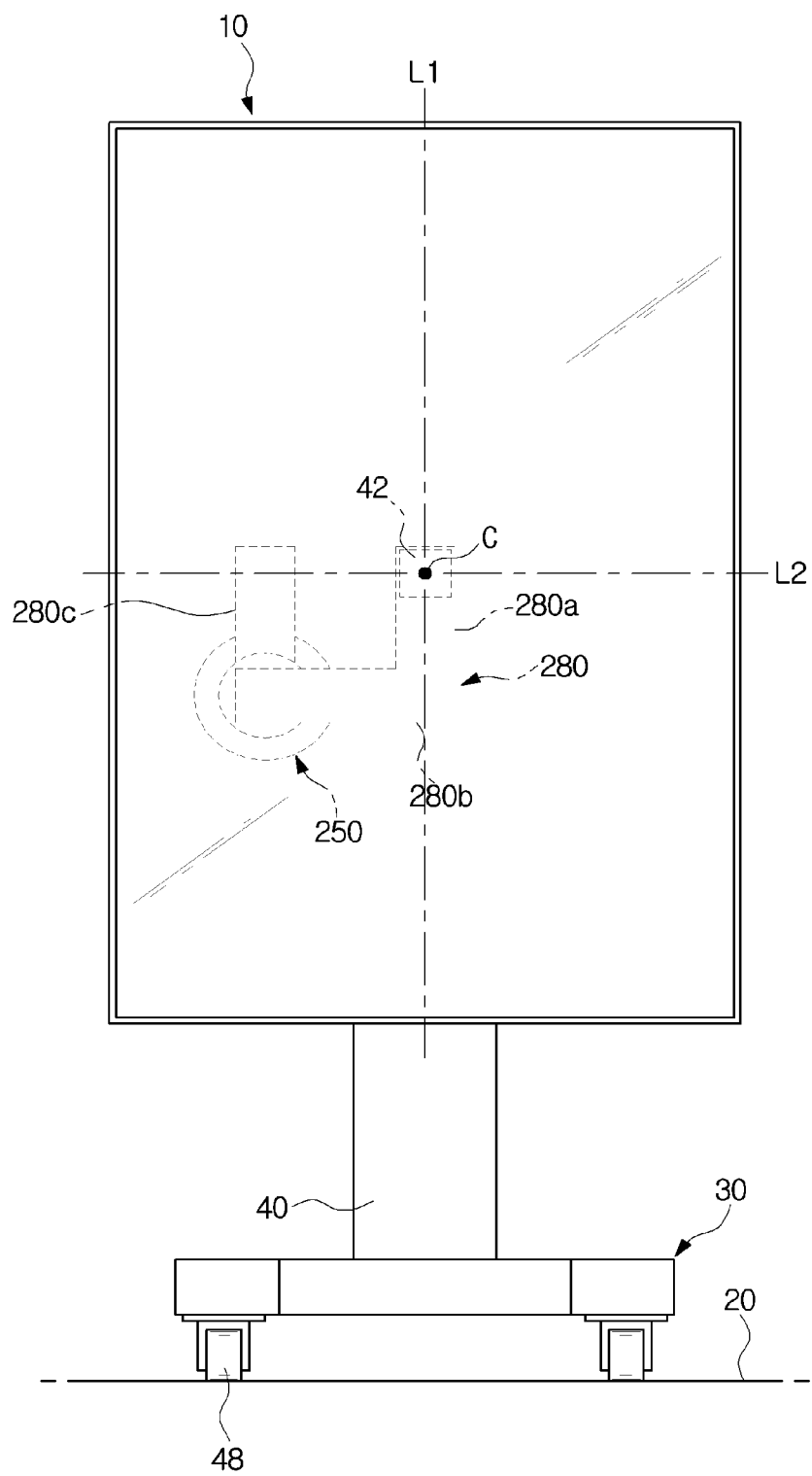
FIGS. 31 to 40 are views for describing operations of a display apparatus according to another embodiment of the present disclosure.
Figure 32:
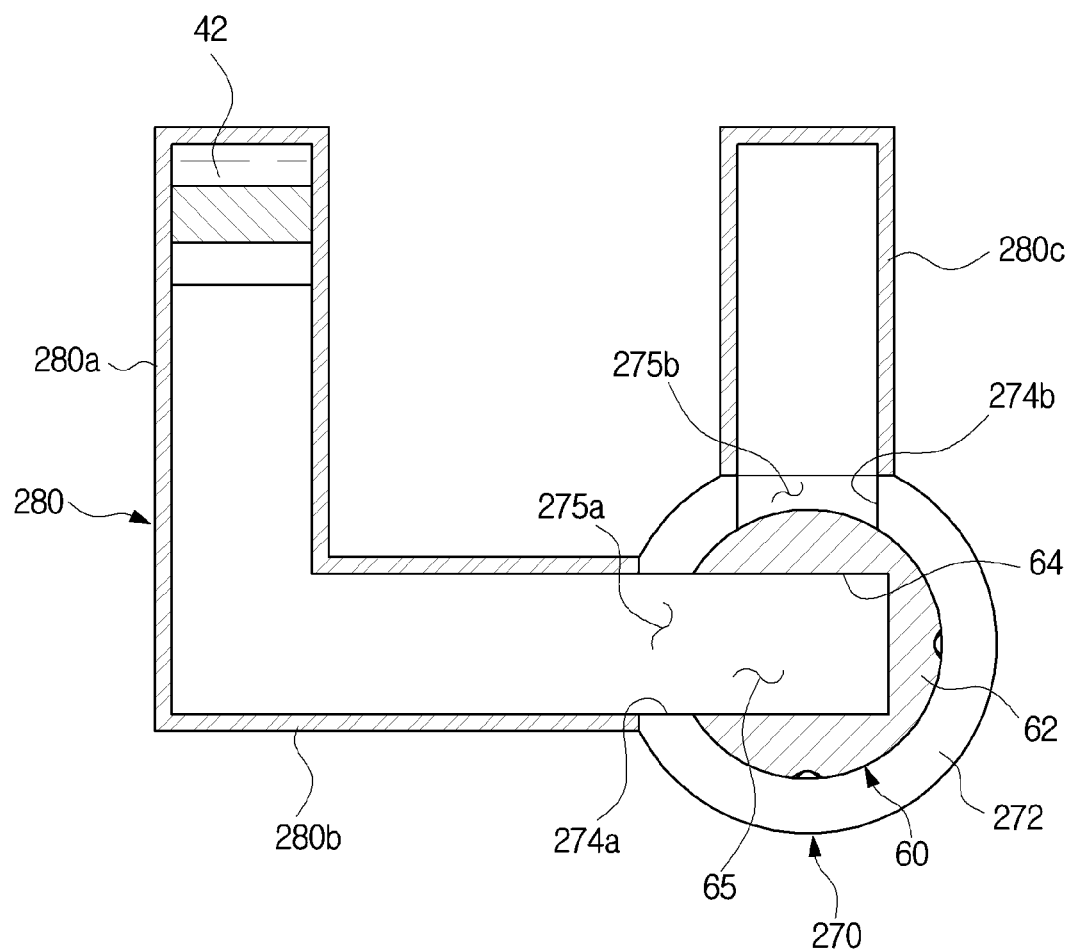
Figure 33:
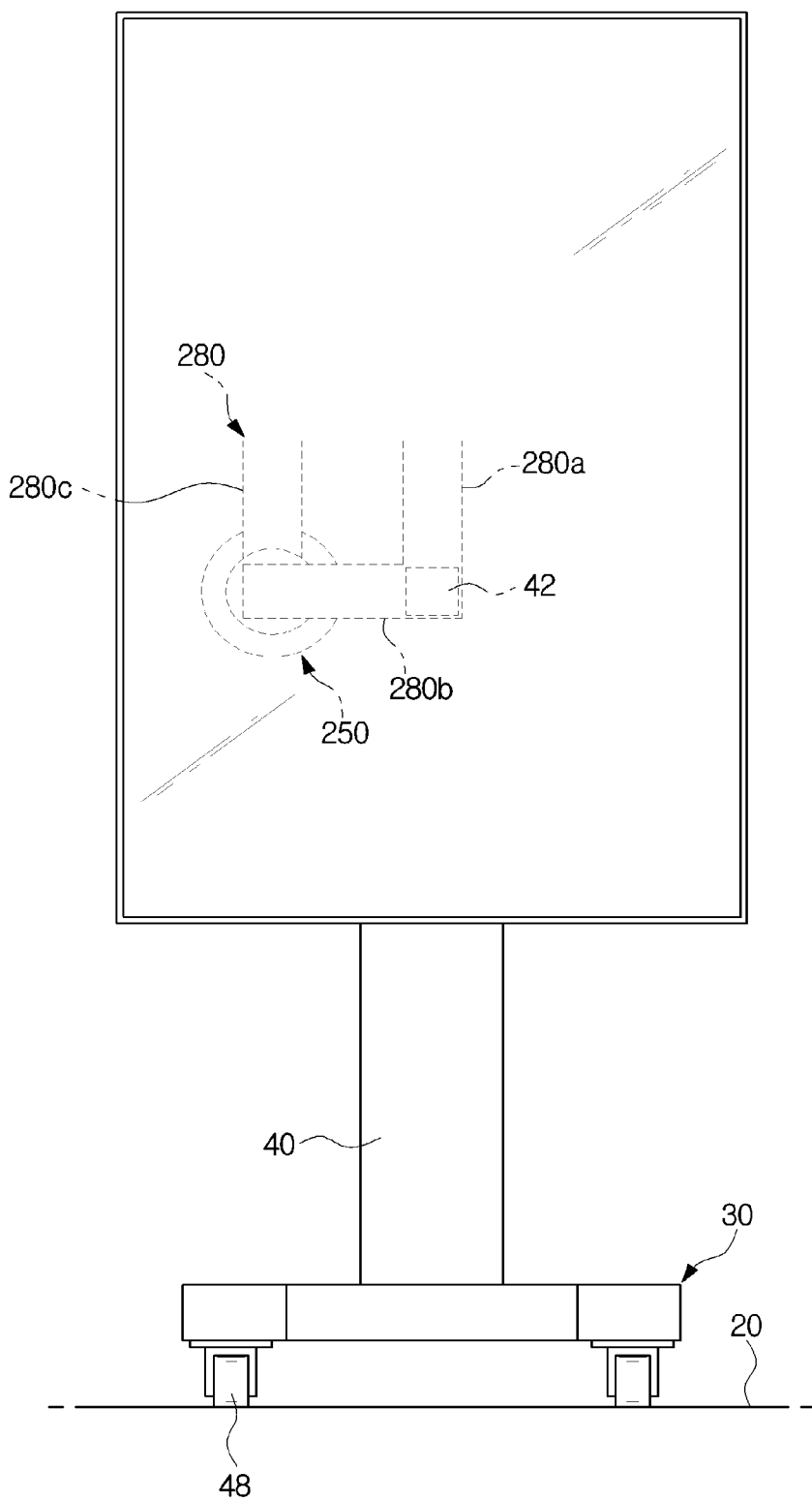
Figure 34:
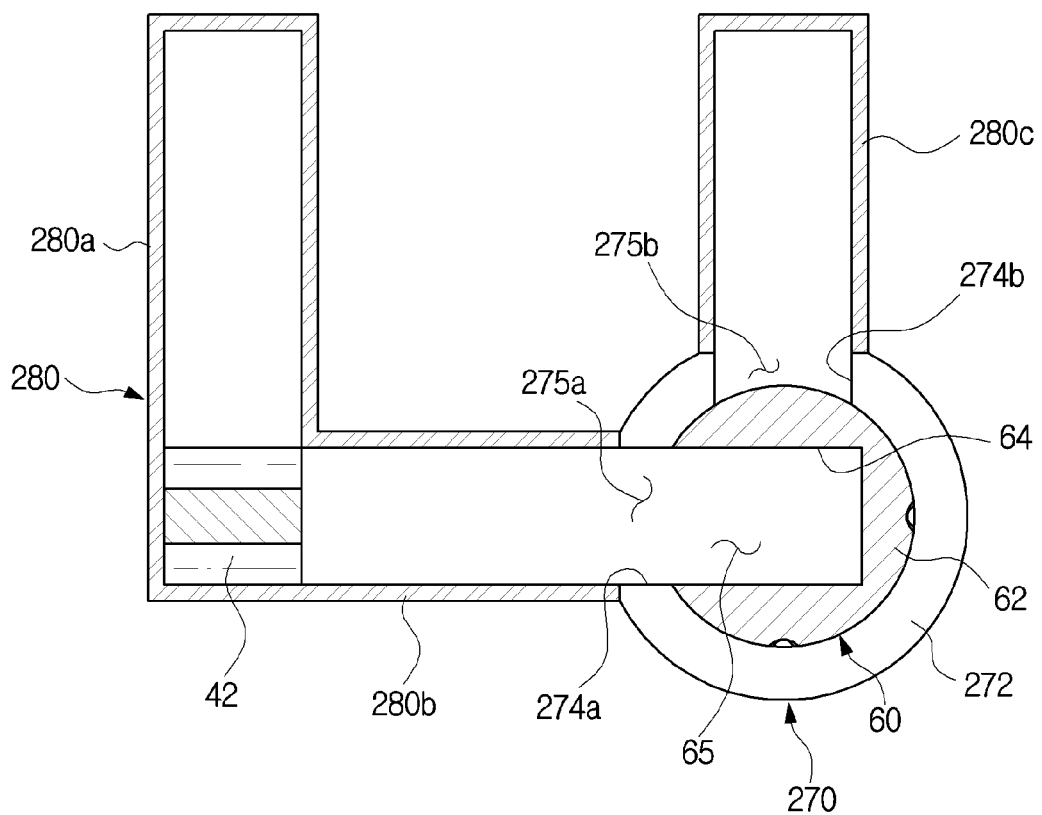
Figure 35:
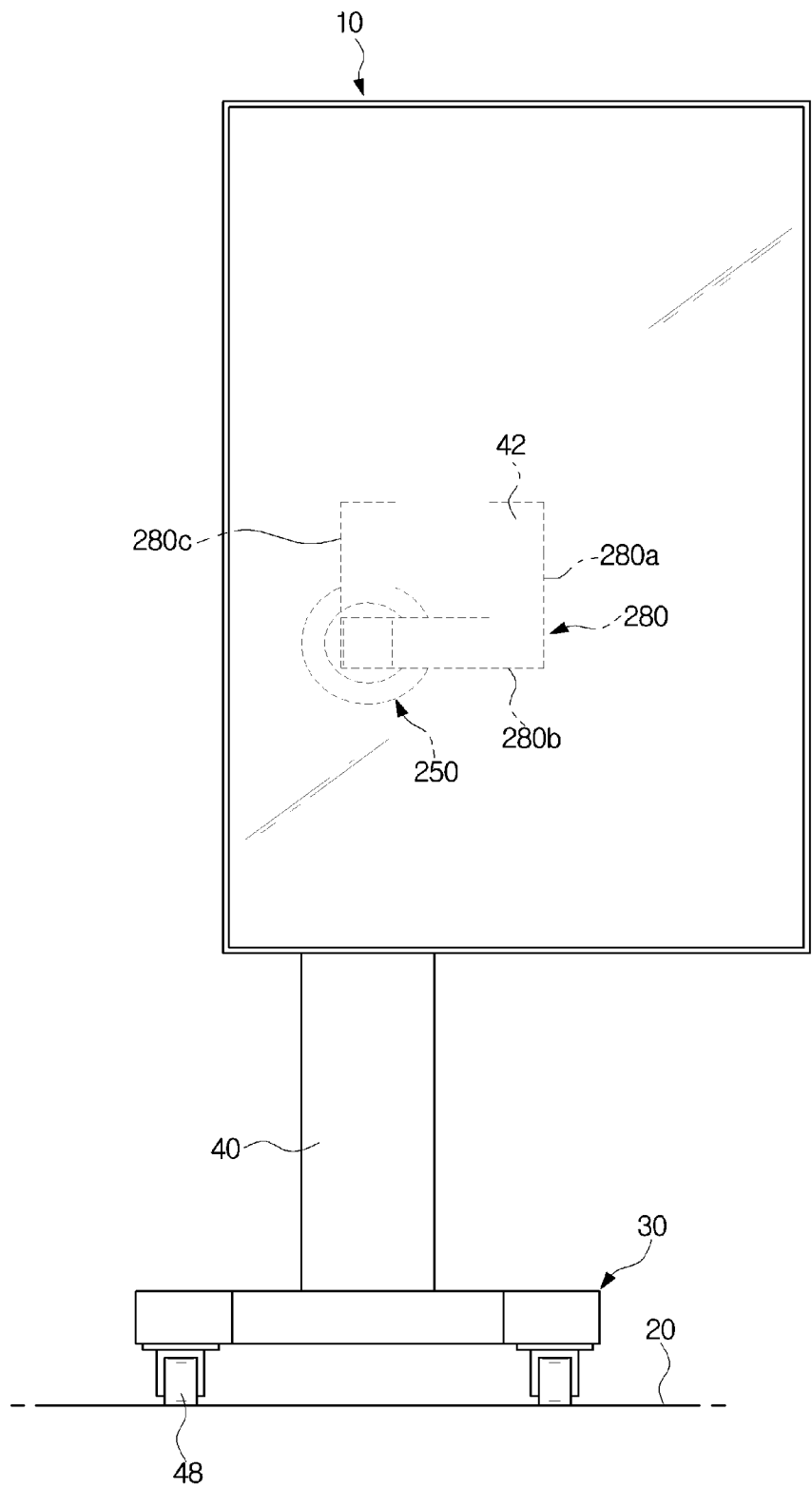
Figure 36:
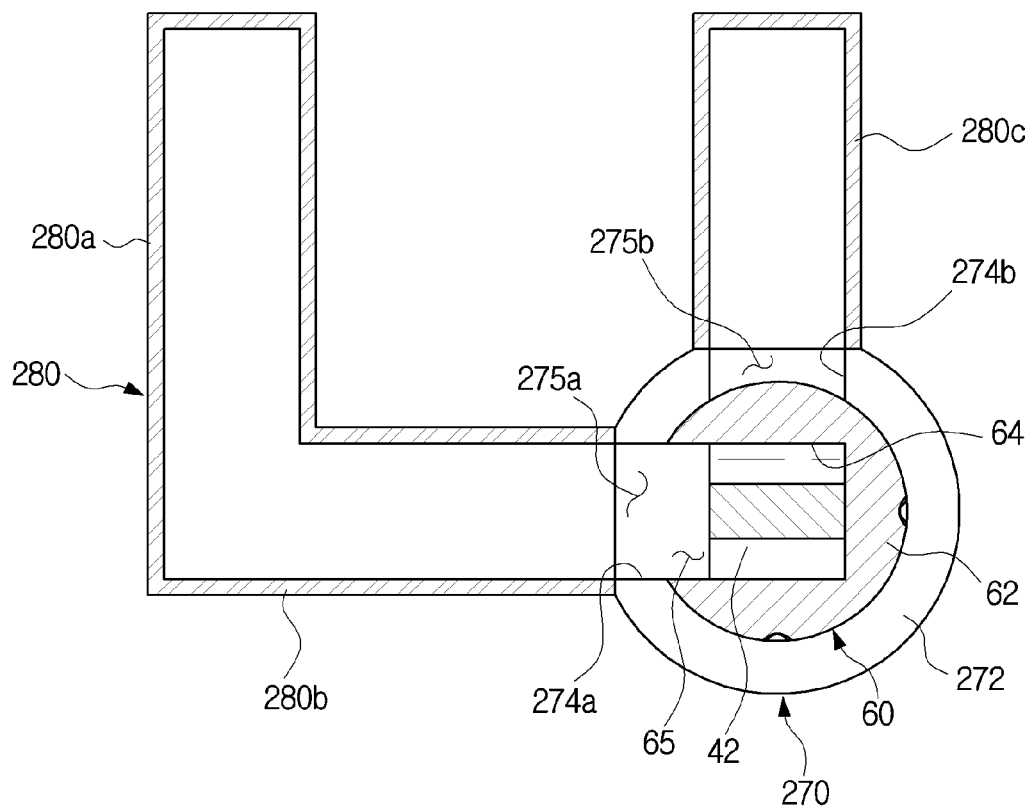

In FIG. 31, the display assembly 10 may be positioned in the portrait mode A. The supporting boss 42 may be located on the rail 280 to prevent the display assembly 10 from rotating. That is, the display assembly 10 may operate in the portrait mode A.

The display assembly 10 may move such that the supporting boss 42 passes through the first rail 280a and the second rail 280b of the rail 280, as shown in FIGS. 33, 34, 35 and 36. The display assembly 10 may move vertically and horizontally along the first and second rails 280a and 280b such that the supporting boss 42 is inserted into the boss insertion portion 64 of the boss holder 60. The boss path 275a of the rotation holder 270 may be disposed between the second rail 280b and the boss insertion portion 64. The display assembly 10 may move so that the supporting boss 42 is inserted into the boss insertion portion 64 from the second rail 280b.

Figure 37:
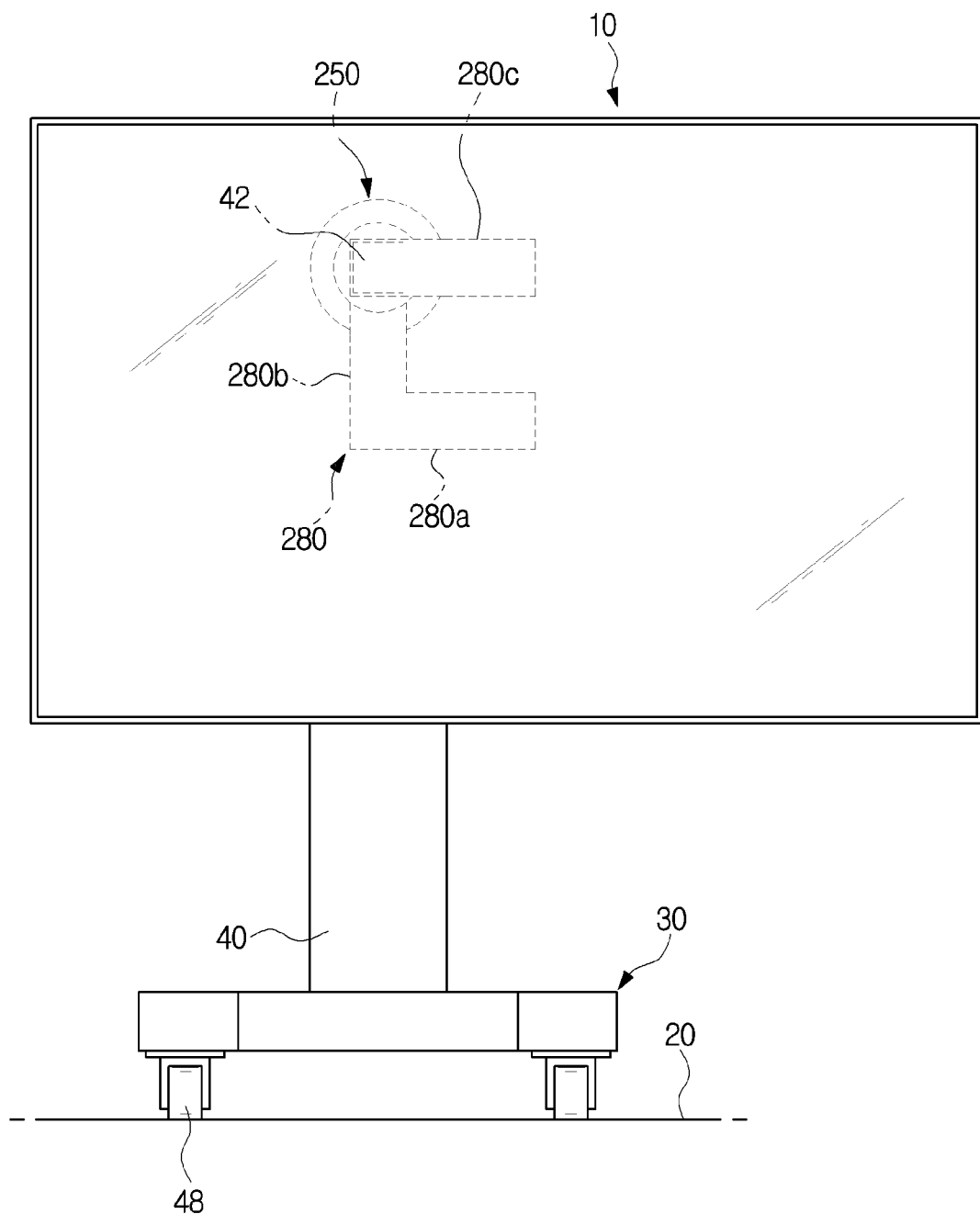
Figure 38:
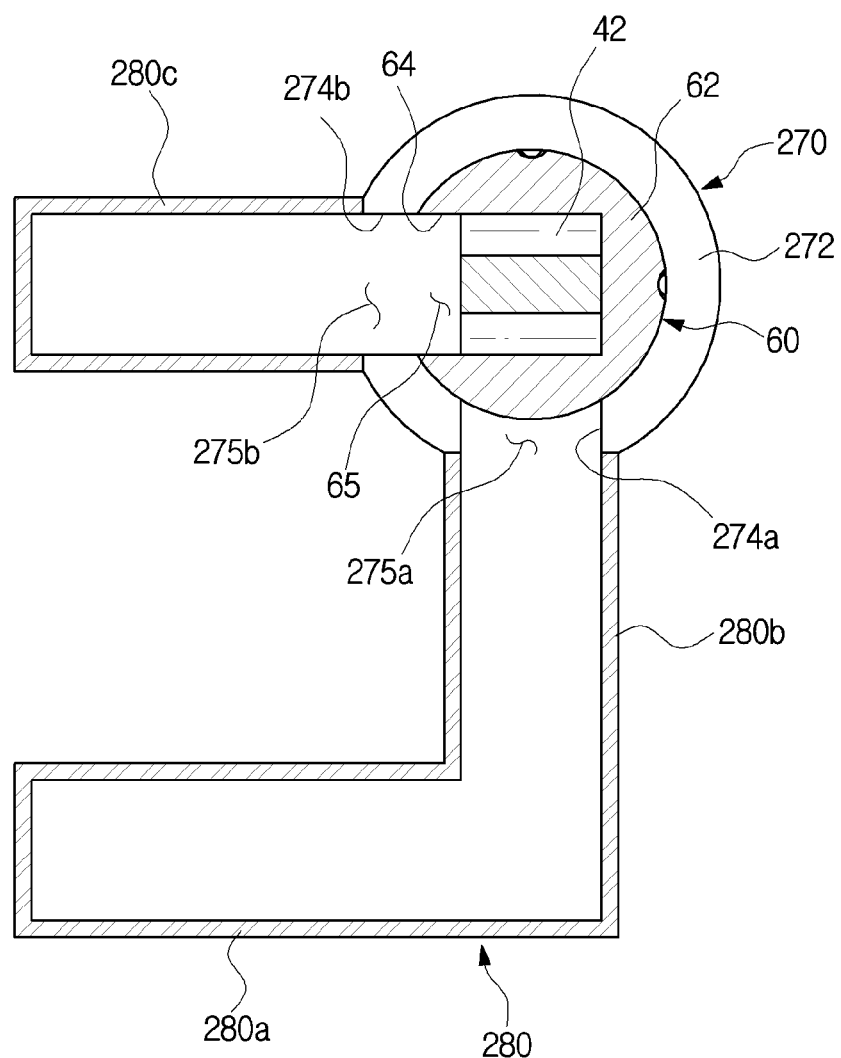
Figure 39:
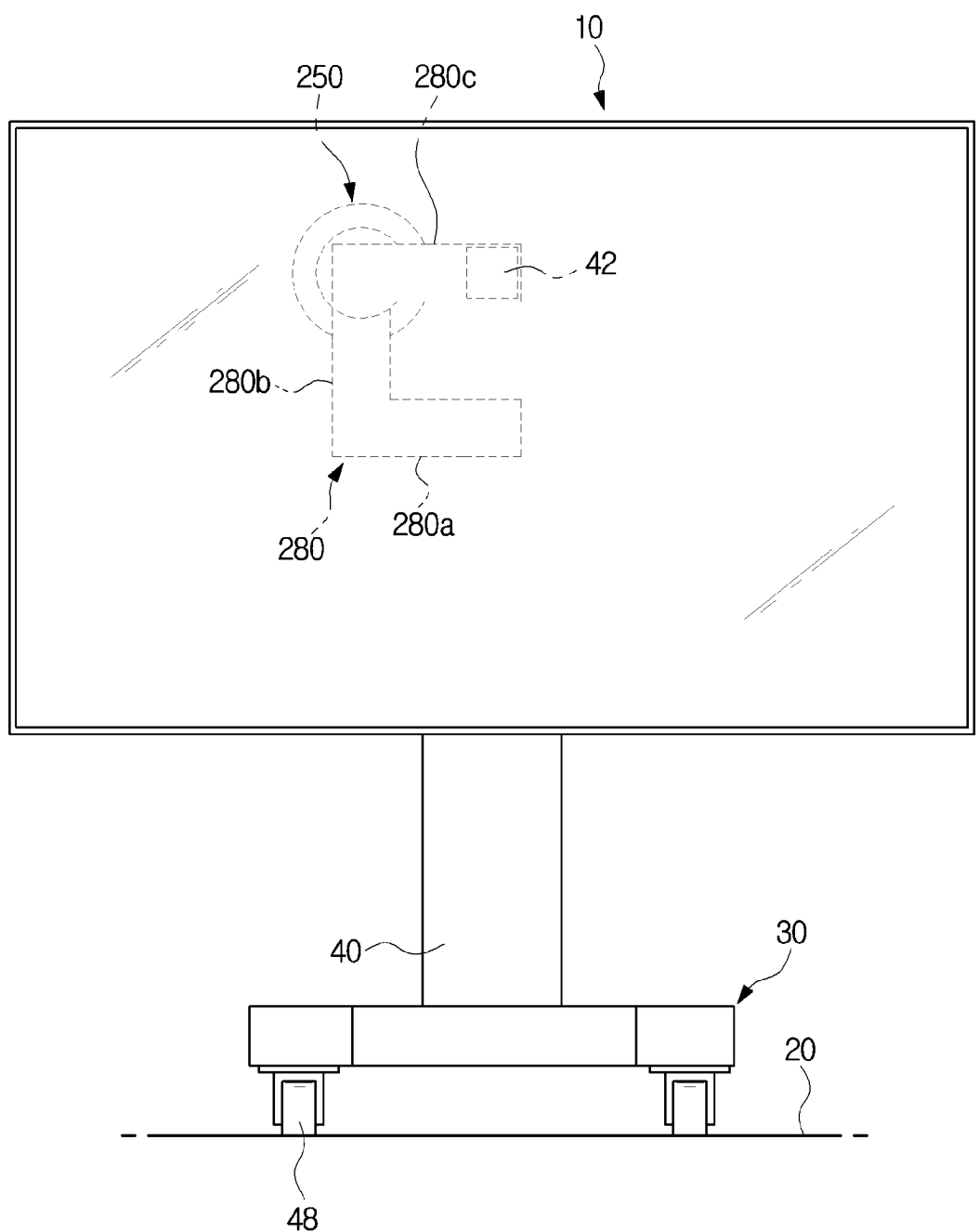
Figure 40:
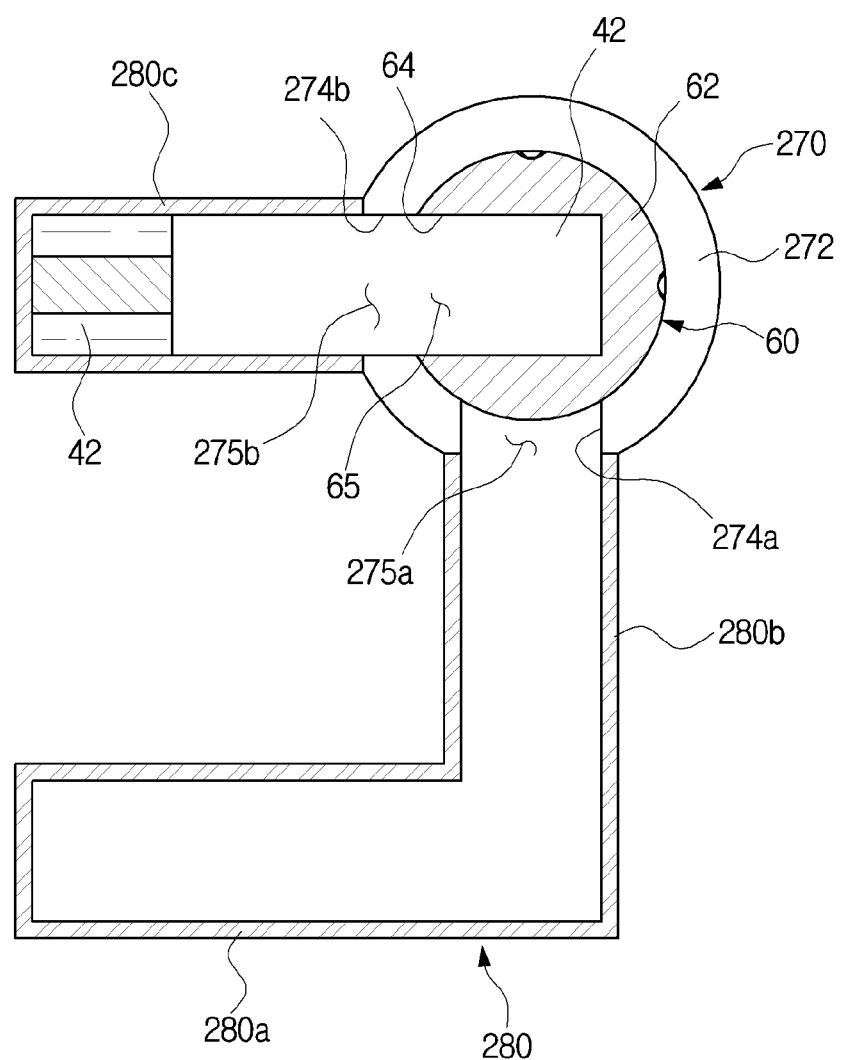

FIGS. 37 and 38 show the display assembly 10 rotated such that the rotation guide 50 is located above the assembly center C. As shown in FIGS. 39 and 40, when the display assembly 10 moves horizontally, the supporting boss 42 may also escape from the boss insertion portion 64 through the boss path 275b to be positioned on the third rail 280c.

Thereby, the display assembly 10 may be prevented from rotating, so that the display assembly 10 may operate in the first landscape mode B1.

In the current embodiment, a case in which the display assembly 10 rotates so that the rotation guide 50 is located above the assembly center C has been described. However, the display assembly 10 may rotate so that the rotation guide 50 is positioned below the assembly center C.

Hereinafter, a display apparatus according to another embodiment of the present disclosure will be described.

Hereinafter, a detailed description about the same components as those described above will be omitted.

Figure 41:
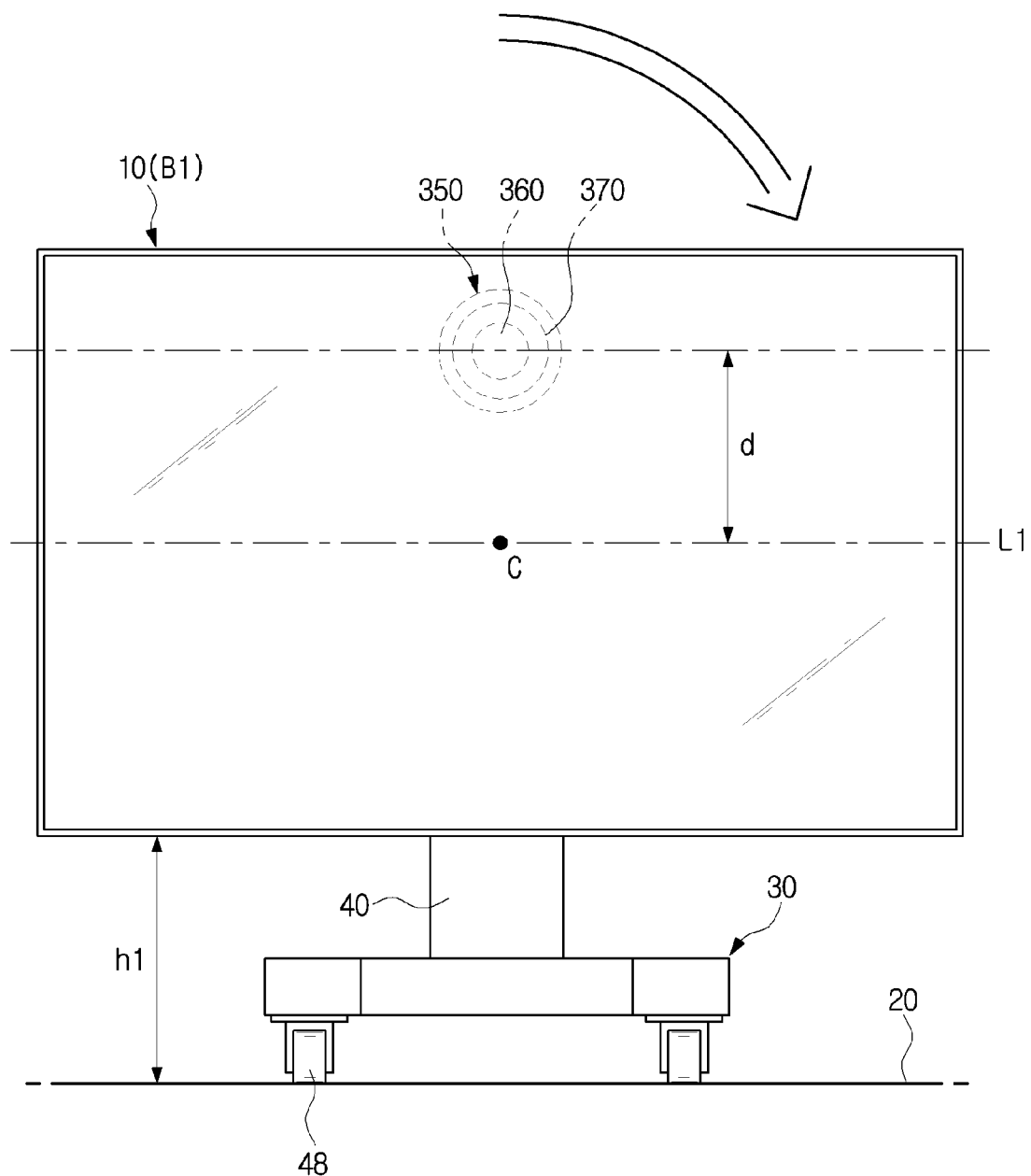
FIGS. 41 and 42 are views for describing operations of a display apparatus according to another embodiment of the present invention.
Figure 42:
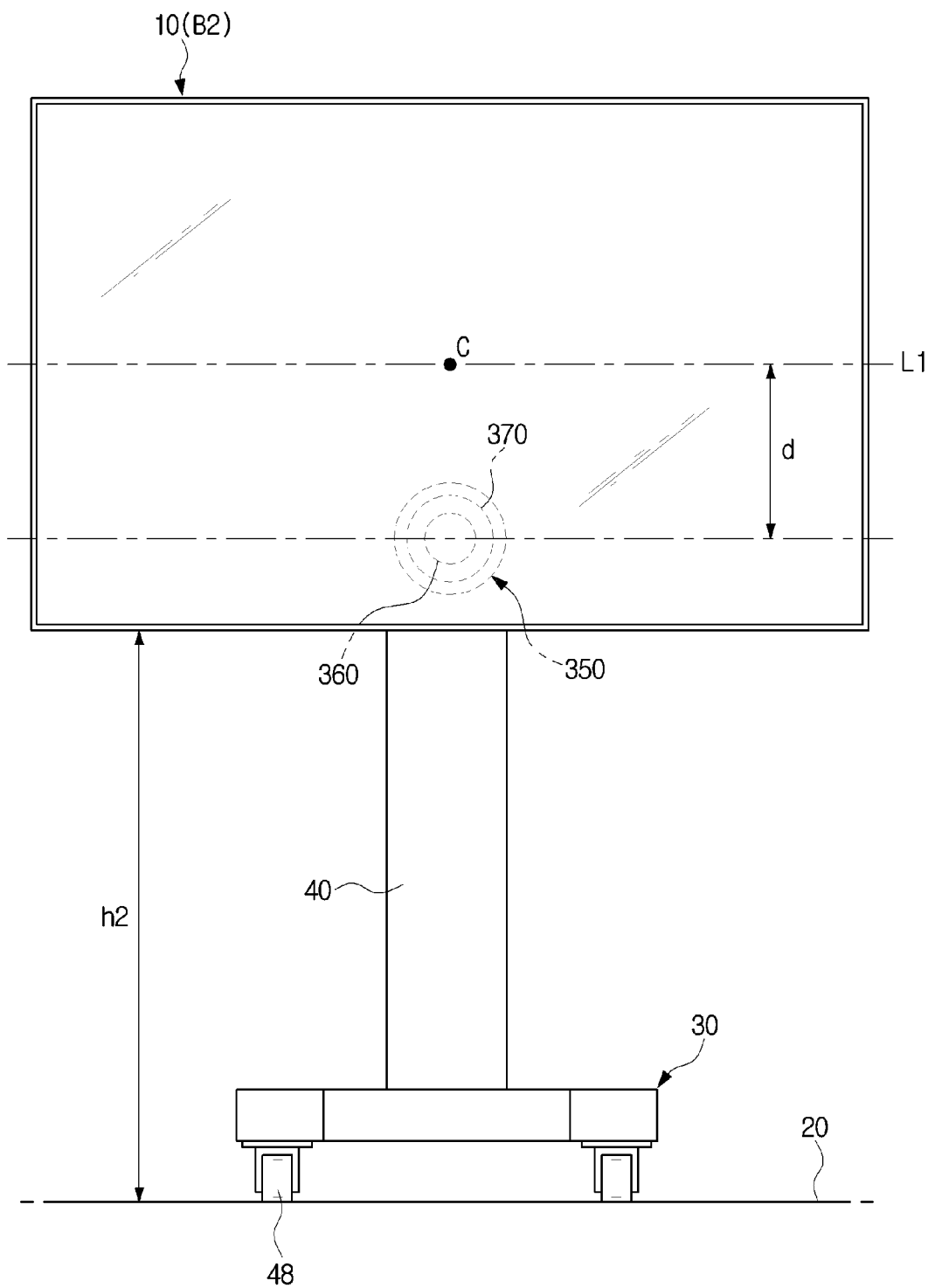

FIGS. 41 and 42 are views for describing operations of a display apparatus according to another embodiment of the present invention.

A rotation guide 350 is provided to allow the display assembly 10 to rotate. The rotation guide 350 may be disposed on the backside of the display assembly 10. The rotation guide 350 may be provided so that the display assembly 10 rotates and is convertible between landscape (B) and portrait (A).

The rotation guide 350 may be spaced apart from the center of the display assembly 10. The center of the display assembly 10 may be referred to as an assembly center (C). When the display assembly 10 is landscape (B), the horizontal direction center line passing through the assembly center (C) is referred to as a first center line (L1), and the vertical direction center line passing through the assembly center is referred to as a second center line (L2). The assembly center (C) may be the center of the width and height of the display assembly (10) or the center of gravity of the display assembly (10).

In the above embodiments, the rotation guide 50 is configured to be connected to the rail 80. However, in the present embodiment, a display apparatus in which the rail 80 is omitted will be described.

The rotation guide 350 may include a rotation boss 360 and a rotation holder 370.

The rotation boss 360 may be provided to be inserted into the rotation holder 370. The rotation holder 370 may form an insertion space in which the rotation boss 360 is disposed. The rotation holder 370 may be fixed to the stand 40 and the rotation boss 360 may be fixed to the back of the display assembly 10.

A rotation holder 370 is rotatably provided with respect to the rotation boss 360 and is fixed to the back surface of the display assembly 10. That is, the rotation holder 370 is fixed to the back surface of the display assembly 10 and rotates together with the display assembly 10. The rotation boss 360 is located within the rotation holder 370 so that the rotation boss 360 is not separated from the rotation holder 370.

The rotation holder 370 is configured to be spaced from the assembly center C in the horizontal direction or along the first center line L1 and configured to be spaced along the vertical direction or the second center line L2. In other words, the rotation holder 370 may be disposed apart from the assembly center (C). In the present embodiment, it is illustrated and described by way of example as being located in the landscape (B1, B2), but it is not limited thereto. That is, the display assembly 10 may be positioned in portrait.

The first and second landscapes B1 and B2 may be positioned to have a height difference of two times the eccentric distance d between the rotation holder 370 and the assembly center C. When the height in the first landscape B1 is h1 and the height in the second landscape B2 is h2, h1+2*d=h2. That is, the display assembly 10 can take any one landscape of the first and second landscape (B1, B2) so that the height of the display assembly 10 can be adjusted according to the user's needs. The first and second landscape (B1, B2) can be changed by changing the rotation angle or by changing the rotation direction. The first landscape and the second landscape may be configured to have a rotation angle of 180 degrees.

The relationship between the rotation of the display assembly 10 and the eccentric distance d has been described by way of example of the change in the height h but the same applies to the change in the assembly center C as well.

Hereinafter, a display apparatus according to another embodiment of the present disclosure will be described.

Hereinafter, a detailed description about the same components as those described above will be omitted.

Figure 43:
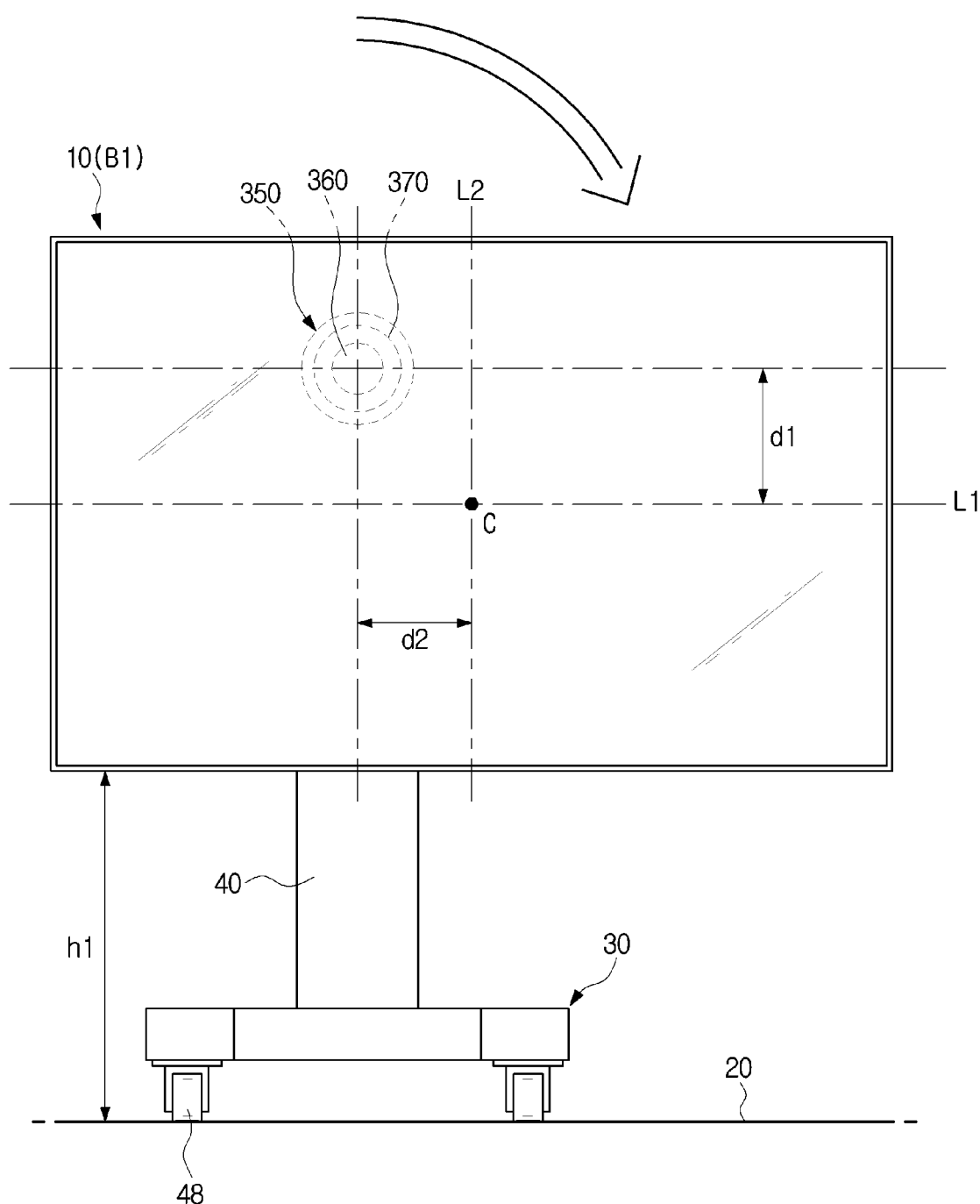
FIGS. 43 and 44 are views for describing operations of a display apparatus according to another embodiment of the present invention.
Figure 44:
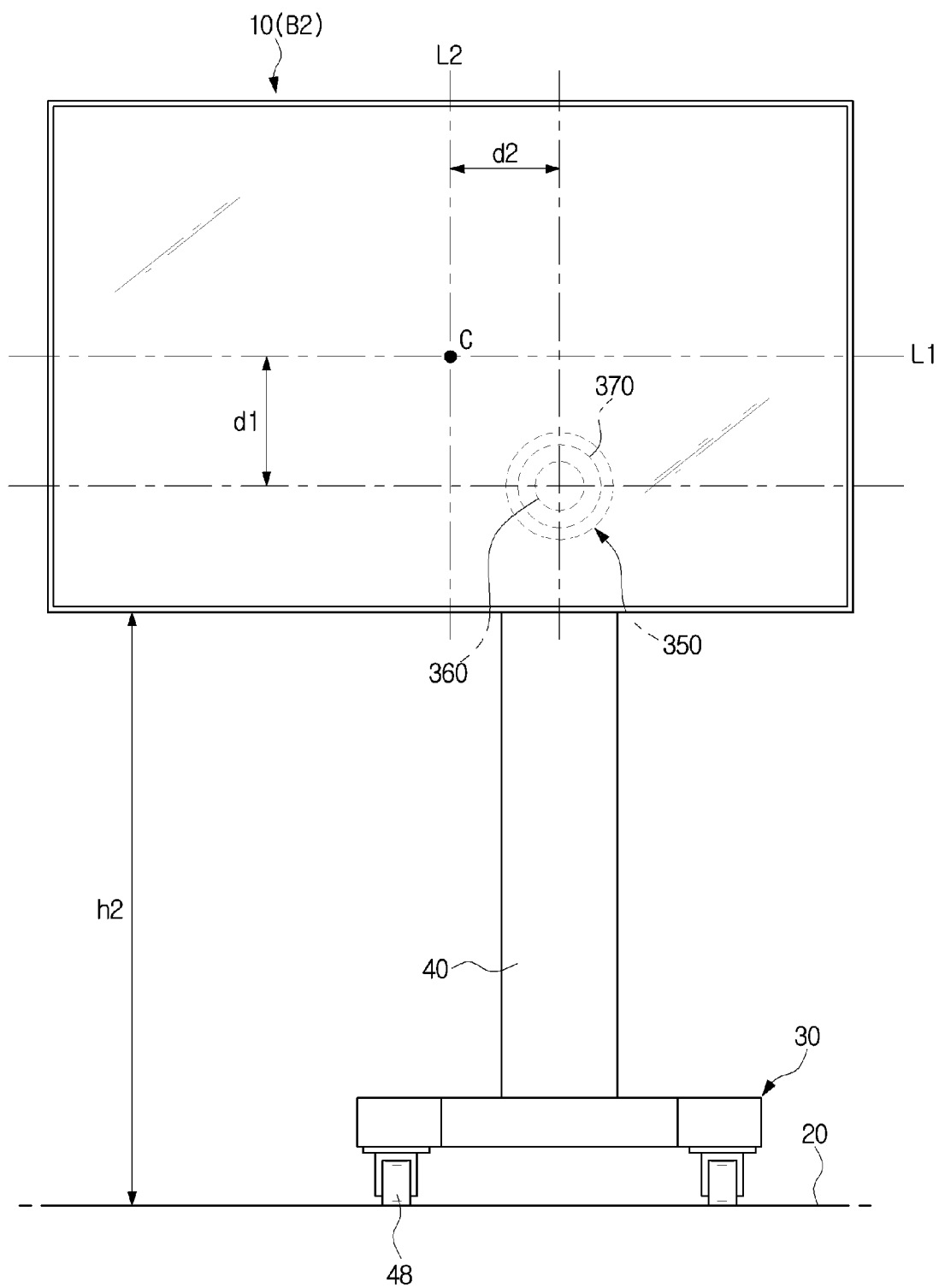

FIGS. 43 and 44 are views for describing operations of a display apparatus according to another embodiment of the present invention.

In this embodiment, unlike the embodiment shown in FIGS. 41 and 42, the rotation holder 370 may be configured to be spaced from the assembly center C in the horizontal direction or along the first center line L1 or may be configured to be spaced along the vertical or second center line L2. That is, the rotation holder 370 may be disposed in a diagonal direction with respect to the assembly center (C). In the present embodiment, it is illustrated and described by way of example as being located in the landscape (B1, B2), but it is not limited thereto. That is, the display assembly 10 may be positioned in portrait.

The first and second landscape B1 and B2 can adjust the height and the left and right distance by twice the eccentric distance d1 and d2 between the rotation holder 70 and the assembly center C. In detail, the eccentricity in the height direction of the rotation holder 70 may be d1, and the eccentricity in the left and right direction may be d2. When the height in the first landscape B1 is h1 and the height in the second landscape B2 is h2, h1+2*d1=h2. When the assembly center (C) in the first landscape (B1) is C1 and the assembly center (C) in the second landscape (B2) is C2, the distance between C1 and C2 can be 2*d2. That is, the display assembly 10 can take any one landscape of the first and second landscape (B1, B2), so that the height adjustment and the left and right eccentricity can be adjusted according to the user's need. The first and second landscape (B1, B2) can be changed by changing the rotation angle or by changing the rotation direction. The first landscape and the second landscape may be configured to have a rotation angle of 180 degrees.

According to an aspect of the present disclosure, the mounting device may support the display assembly, and adjust the height of the display assembly.

According to another aspect of the present disclosure, it is possible to simplify the structure of the mounding device, and to stably support the display assembly.

According to another aspect of the present disclosure, it is possible to change the position of the display assembly according to the purpose of use of the display assembly.

Although a few embodiments have been shown and described, it will be appreciated by those having ordinary skill in the art that changes may be made in these embodiments without departing from the principles and spirit of the disclosure, the scope of which is defined in the claims and their equivalents.

What is claimed is:

1. A display apparatus comprising:
   a display assembly;
   a support frame to support the display assembly; and
   a rotation mechanism to couple to the display assembly to thereby provide a rotation axis spaced apart from a center of the display assembly, the rotation mechanism being configured to enable the display assembly to rotate with respect to the rotation axis to a portrait orientation or a landscape orientation in relation to the support frame,
   wherein the display assembly is configured to rotate with respect to the rotation axis along both a vertical direction and a horizontal direction,
   when the display assembly is in the portrait orientation or the landscape orientation, the display assembly is symmetrical with respect to a vertical center axis of the support frame.

2. The display apparatus of claim 1, wherein the display assembly is viewed from a front in the landscape orientation, the rotation axis is spaced apart from the center of the display assembly in a lower right side direction.

3. The display apparatus of claim 2, wherein the display assembly is viewed from a front in the portrait orientation, the rotation axis is spaced apart from the center of the display assembly in an upper right side direction.

4. The display apparatus of claim 3, wherein the display assembly is rotated from the portrait orientation to the landscape orientation through clockwise rotation.

5. The display apparatus of claim 3, wherein the display assembly is rotated from the landscape orientation to the portrait orientation through counterclockwise rotation.

6. The display apparatus of claim 1, wherein while the display assembly is rotating, a distance from a mounting surface to the rotation axis is kept constant.

7. The display apparatus of claim 6, wherein a distance between an upper end of the display assembly in the portrait orientation and the rotation axis is same as a distance between an upper end of the display assembly in the landscape orientation and the rotation axis.

8. The display apparatus of claim 7, wherein a distance between the mounting surface and the upper end of the display assembly in the portrait orientation is same as a distance between the mounting surface and the upper end of the display assembly in landscape orientation.

9. The display apparatus of claim 1, wherein the rotation mechanism is arranged between the display assembly and the support frame.

10. The display apparatus of claim 9, wherein the rotation mechanism comprises:
    a rotation holder to couple the rotation mechanism to a rear surface of the display assembly and rotate together with the display assembly.

11. The display apparatus of claim 1, wherein the display assembly performs rotational movement with respect to the support frame in a stationary state.

12. A display apparatus comprising:
    a display assembly;
    a support frame formed to extend upward from a mounting device to support the display assembly from behind the display assembly; and
    a rotation shaft configured to couple to the display assembly to thereby form a rotation axis of the display assembly which is at a distance spaced apart from a center of the display assembly,
    wherein the display assembly eccentrically rotates about the rotation axis, and
    when the display assembly is arranged in a portrait orientation or a landscape orientation, opposite side portions of the display assembly that do not overlap with the support frame are bilaterally symmetrical to each other with respect to a center of the support frame.

13. The display apparatus of claim 12, wherein the rotation axis of the display assembly is spaced apart from the center of the display assembly in a diagonal direction.

14. The display apparatus of claim 13, wherein the display assembly is rotating clockwise such that the display assembly is rotated from the portrait orientation to the landscape orientation.

15. The display apparatus of claim 14, wherein the display assembly is rotating counterclockwise such that the display assembly is rotated from the landscape orientation to the portrait orientation.

16. The display apparatus of claim 12, wherein while the display assembly is rotating, a distance from the mounting device to the rotation axis is kept constant.

17. The display apparatus of claim 16, wherein a distance between the mounting device and an upper end of the display assembly in the portrait orientation is same as a distance between the mounting device and an upper end of the display assembly in the landscape orientation.

18. The display apparatus of claim 12, wherein the rotation shaft is provided behind the display assembly.

19. The display apparatus of claim 12, wherein the display assembly is viewed from a front in the landscape orientation, the rotation axis is spaced apart from the center of the display assembly in a lower right side direction.

20. The display apparatus of claim 19, wherein the display assembly is viewed from a front in the portrait orientation, the rotation axis is spaced apart from the center of the display assembly in an upper right side direction.

* * * * *